United States Patent
Woolven et al.

(10) Patent No.: US 12,555,659 B1
(45) Date of Patent: Feb. 17, 2026

(54) SYSTEMS AND METHODS FOR DIGITALLY INTERPRETING ONE OR MORE LINGUISTIC SECTIONS OF A DIGITAL FILE

(71) Applicant: Veeva Systems Inc., Pleasanton, CA (US)

(72) Inventors: Eric Mitchell Woolven, Toronto (CA); Marius K. Mortensen, Burlington (CA); Bradley Arnold, Denver, CO (US)

(73) Assignee: Veeva Systems Inc., Pleasanton, CA (US)

( * ) Notice: Subject to any disclaimer, the term of this patent is extended or adjusted under 35 U.S.C. 154(b) by 65 days.

(21) Appl. No.: 18/744,934

(22) Filed: Jun. 17, 2024

Related U.S. Application Data

(60) Provisional application No. 63/513,747, filed on Jul. 14, 2023.

(51) Int. Cl.
*G06F 40/103* (2020.01)
*G16H 20/10* (2018.01)
*H04L 9/32* (2006.01)

(52) U.S. Cl.
CPC ........... *G16H 20/10* (2018.01); *G06F 40/103* (2020.01); *H04L 9/3247* (2013.01)

(58) Field of Classification Search
None
See application file for complete search history.

(56) References Cited

U.S. PATENT DOCUMENTS

| | | | |
|---|---|---|---|
| 2017/0287090 A1* | 10/2017 | Hunn | H04L 63/12 |
| 2021/0352132 A1* | 11/2021 | Nix | H04L 67/06 |
| 2022/0003676 A1* | 1/2022 | Mazed | G01N 21/658 |
| 2022/0014383 A1* | 1/2022 | Duncan | H04L 63/126 |
| 2022/0270725 A1* | 8/2022 | DeRosa-Grund | G06F 16/2365 |
| 2022/0393881 A1* | 12/2022 | Ow | G06Q 20/3678 |
| 2022/0406422 A1* | 12/2022 | Crowley | G16H 20/10 |
| 2023/0214792 A1* | 7/2023 | Lee | G06Q 20/02 |
| | | | 705/75 |
| 2024/0273411 A1* | 8/2024 | Mueck | H04L 9/3263 |

\* cited by examiner

*Primary Examiner* — Eliyah S. Harper

(57) ABSTRACT

A method for executing at least a portion of a digital file including receiving one or more linguistic sections of the digital file. The method includes receiving a submission ruleset including at least one submission rule. The submission rule includes a rule criteria and a lifecycle parameter set to inactive. The method includes generating the digital file including the one or more linguistic sections. The method includes outputting the digital file and receiving a digital signature of the digital file. The method includes activating the submission rule by modifying the lifecycle parameter from inactive to active. The method includes selecting a case dataset including case data from a repository of the provider computing system. The method includes determining the case data fulfills the rule criteria. The method includes outputting the case dataset in response to the case data of the case dataset fulfilling the rule criteria of the submission rule.

20 Claims, 11 Drawing Sheets

500

☐ PVA Relationships > Pharma X > ... > PVA-0001
☆ PV Agreement: PVA-0001 (Initiated) — 504

Details
Covered Products (2)
Covered Studies (3)
Agreement Countries (2)
Contacts (3)
Action Items (1)
Obligations (12)
Activities (0)
Reconciliations (0)
Agreement Documents (3)
Workflow Timeline
Signatures (0)
System ▼ Details Relationship Supplier X — 506
Agreement Title Pharma X and Supplier X 2023 Global — 508
Agreement Effective Date 01 Jan 2023 — 510
Agreement End Date 31 Dec 2023 — 512
PAV Scope Global — 514
Agreement Owner John Smith — 516
Agreement Notes Standard agreement for 2023 — 518

▼ Covered Products — 520

[+ Add]  [🔍        ] ☐ Show in Tab                    1-2 of 2 ...

| Product Name ▲ | Product Type | Abbreviation |
|---|---|---|
| Drug X — 524 | Drug — 526 | CH — 527 |
| Drug Y — 524 | Drug — 526 | WD — 527 |

☐ PVA Relationships > Pharma X > ••• > PVA-0001 > PVA-0001

☆ PV Agreement: PVA-0001 (Initiated) — 528  ✏

| Details — 530 | Study Number ▲ | Study Name | Protocol Title | Study Type | Masking |
|---|---|---|---|---|---|
| Covered Products (2) | STU-001 — 532 | A Blinded Multi-center Trial of... Show more | 534 | Clinical Trial — 536 | Double-blind — 538 |
| Covered Studies (3) — 530 | STU-002 — 532 | An open label trial of Drug X... Show more | 534 | Clinical Trial — 536 | Open Label — 538 |
| Agreement Countries (2) — 530 | STU-003 — 532 | Compassionate Use of Drug X... Show more | 534 | Individual Patient Use — 536 | Open Label — 538 |

Contacts (3) — 530
Action Items (1) — 530
Obligations (12)
Activities (0)

▼ Agreement Countries — 540                                               1-2 of 2  •••

| + Add [ Q ] Show in Tab ⟶ 552 | | |
|---|---|---|
| Name ▲ | Code (2-letter) | Code (3-letter) |
| France — 544 | FR — 546 | FRA — 548 |
| Germany — 544 | DE — 546 | DEU — 548 |

Reconciliations (0)
Agreement Documents (3)
Workflow Timeline — 542
Signatures (0) — 542
System ▼ Contacts                                                                 1-3 of 3  •••

| + Create [ Q ] Show in Tab | | | | |
|---|---|---|---|---|
| Name ▲ | Person | Vault User | Contract Party | Communication Method |
| PVA-0001-C001 — 556 | John White — 558 | John Smith — 560 | Sponsor — 562 | Vault Task — 564 |
| PVA-0001-C002 — 556 | | | Partner — 562 | Email — 564 |

EX-10.23.24 a2213875zex-10_23.htm EX-10.23

Exhibit 10.23

***Text Omitted and Filed Separately with the Securities and Exchange Commission.
Confidential Treatment Requested under 17 C.F.R. Sections 200.80(b)(4) and 230.406

MANUFACTURING AND SUPPLY AGREEEMENT effective as of this 9 day of January, 2021 ("the Effective Date")

by and between

Pharma Company 123 AG
93 John Nolen Dr.
Madison, WI
United States of America (hereinafter "Company 123")

and

Cancer Research Company 2211
London
United Kingdom (hereinafter "Cancer 2211")

Signature version

WHEREAS, Company 123 is engaged in the manufacture, marketing and sales of pharmaceutical products;

WHEREAS, Cancer 2211 is a company engaged in the processing and supply of pharmaceutical products holding the necessary manufacturing licenses and permits in this respect;

WHEREAS, Company 123 and Cancer 2211 have entered into a Distribution and License Agreement dated 8April 2011 (the"Distribution and License Agreement") whereby Cancer 2211 has appointed Company 123 to, distribute and sell certain products in the Territory, as defined therein;

WHEREAS, Company 123 requires Cancer 2211 to perform certain services related to the Processing and supply of the Product (each as defined herein) pursuant to the Specifications and the terms and conditions of this Agreement and requires that Cancer 2211 perform certain additional packaging and labelling services.

NOW, THEREFORE, in consideration of the foregoing premises and the following mutual covenants and for other good and valuable consideration, the receipt and sufficiency of which is hereby acknowledged, the Parties hereto agree as follows:

1. Definitions
1.1 Defined Terms ⟵ 604

In this Agreement capitalized words and phrases shall have the same meaning as in the Distribution and License Agreement, save that the following terms shall, unless the context otherwise requires, have the respective meanings set out below and grammatical variations of such terms shall have corresponding meanings:

"Acknowledgement" shall have the meaning given to it in Clause 5.5.

"Additional Services" shall mean the Packaging and Labelling of Product to produce Finished Product in a Presentation ready for sale in a particular country or group of countries in the Territory and the testing and release of the Finished Product.

The Party holding the Marketing Authorisation in a country shall be responsible for submitting PSURs and other periodic safety reports to the Regulatory Authority in that country according to the applicable laws, regulations and guidelines.

1.6  Safety Data Exchange   608

1.6.1  Method of Exchange

For individual case summary reports (ICSRs) on Product, each party agrees to provide the other party with a CIOMS I report form (as defined in Appendix 3). The CIOMS 1 Report form will reflect the source data comprehensively and accurately without interpretation of reported information. These will be transmitted via email with facsimile or courier to be used only as a contingency.

Source documents will be retained indefinitely by Novartis for all ICSRs. Source documents will be made available to GW upon request and in a reasonable timeframe.

All "Other Potential Safety Related Issues" and "Non-valid Reports" will also be subject to the same data exchange provision methods of exchange as described above. If it is not possible to present these types of safety data as a CIOMS I report form, the most applicable report format will be used.

Detailed information pertaining to the timelines for data exchange between the parties is described in Appendix 3.

1.6.2  Reconciliation of Reports

Quarterly, not later than thirty (30) days after the end of each calendar quarter, each party shall provide the other with a listing of all ICSRs exchanged and other potential safety related issues that were sent/received and entered into the global safety database, to enable each party to reconcile all reports received from the other party during the preceding calendar quarter, and to confirm that the safety data exchange process is functioning properly. Where discrepancies between the parties safety data are identified, each party agrees to inform the other party, to take reasonable steps to reconcile the data, and to take all reasonable actions to prevent reoccurrence.

If the number of ICSRs reported to Novartis monthly exceeds 100 cases, reconciliation frequency will be carried out monthly (thirty days after the end of the calendar month).

1.6.3  Dictionary

The MedDRA dictionary shall be used by both parties for coding all Safety Information that shall be exchanged in accordance with this PV Agreement. All regulatory reports should be coded using the latest version/preceding version of MedDRA current at the time that the report was received.   612

1.7  Signal Detection and Risk Management

Cancer 2211 shall primarily be responsible for signal detection, benefit-risk assessments and approve all risk minimization activities of Product and Company 123 shall additionally assist Cancer 2211 for such processes. Cancer 2211 will maintain safety surveillance activities for the Product globally. In the event that a potential or definite safety signal is identified, Cancer 2211 will respond appropriately and expediently, depending on the severity and significance of the signal.

The minimum requirements for signal detection shall include:

FIG. 6B

| Rule Name | Rule Set Name | Rule Status | Rule Priority | Overridden Rule | Overridden Rule Set | AE in Jurisdiction | Agency | Assessment Criteria |
|---|---|---|---|---|---|---|---|---|
| OTC Reporting Rule | Scenario 4 Ruleset | Active Rule | 1 | | | Yes | | |
| Non-Serious Rule | ANVISA Brazil Ruleset | Active Rule | 1 | | | | | |
| SUSAR Cross Report Rule | Scenario 2 Ruleset | Active Rule | 1 | | | | | SUSAR |
| FDARule | Scenario 5 Ruleset-FDA | Active Rule | 1 | EMARule | Scenario5 -Ruleset EMA | | | |

FIG. 7A

| Assessment Source | Device Report Type | Downgraded | Due in Days | Exclude | Expected | Fatal | Is Follow-up | Life Threatening | Local Expected Criteria | Previously Submitted | Product | Product Registration |
|---|---|---|---|---|---|---|---|---|---|---|---|---|
| | | | 21 | | No | | | | | | | OTC Drug |
| | | | 30 | | | | | | | | | |
| | | | 15 | | | | | | | | scenario5_c | |
| | | | 30 | | Yes | | | | | | | |

FIG. 7B

SYSTEMS AND METHODS FOR DIGITALLY INTERPRETING ONE OR MORE LINGUISTIC SECTIONS OF A DIGITAL FILE

CROSS REFERENCE TO RELATED APPLICATIONS

This application claims priority to U.S. Provisional Patent Application No. 63/513,747, filed Jul. 14, 2023, which is incorporated herein by reference.

TECHNICAL FIELD

The present disclosure relates to systems and methods for digitally interpreting one or more linguistic sections of a digital file.

BACKGROUND

Researchers, scientists, industry players, academics, government regulators, and other stakeholders are increasingly in need of efficient and simple ways to interpret and execute digital files including digital pharmacovigilance agreements (PVAs).

SUMMARY

One embodiment relates to a method for executing at least a portion of a digital file. The method includes receiving one or more linguistic sections of the digital file. The one or more linguistic sections include first text data in a first language and identify a medical product associated with the digital file. The method further includes receiving a submission ruleset including at least one submission rule. The submission rule includes a rule criteria and a lifecycle parameter set to inactive. The method further includes validating the submission ruleset. The method further includes generating the digital file including the one or more linguistic sections. The method further includes outputting the digital file and receiving a digital signature of the digital file, in response to outputting the digital file. The method further includes activating the submission rule by modifying the lifecycle parameter of the submission rule from inactive to active. The method further includes selecting a case dataset including case data from a repository of the provider computing system. The case data includes medical product data associated with the medical product. The method further includes determining the case data of the case dataset fulfills the rule criteria of the submission rule. The method further includes outputting the case dataset in response to the case data of the case dataset fulfilling the rule criteria of the submission rule.

Another embodiment relates to a method for executing at least a portion of a digital file. The method includes receiving one or more linguistic sections of the digital file. The one or more linguistic sections include first text data in a first language and identify a medical product associated with the digital file. The method further includes generating a submission ruleset including at least one inactive submission rule based on the one or more linguistic sections of the digital file. The method further includes generating the digital file including the one or more linguistic sections. The method further includes outputting the digital file and receiving a digital signature of the digital file, in response to outputting the digital file. The method further includes activating the submission rule. The method further includes selecting a case dataset including case data from a repository of the provider computing system. The case data includes medical product data associated with the medical product. The method further includes determining the case data of the case dataset fulfills the rule criteria of the submission rule. The method further includes outputting the case dataset in response to the case data of the case dataset fulfilling the rule criteria of the submission rule.

Another embodiment relates to a method for executing at least a portion of a digital file. The method includes receiving one or more linguistic sections of the digital file. The one or more linguistic sections include first text data in a first language and identify a medical product associated with the digital file. The method further includes receiving a submission ruleset including at least one submission rule. The submission rule includes a rule criteria. The method further includes validating the submission ruleset. The method further includes generating the digital file including the one or more linguistic sections. The method further includes receiving a request to execute the digital file. The method further receiving a source file and determining case data based on the source file. The case data includes medical product data associated with the medical product. The method further includes generating a case dataset including the case data. The method further includes determining the case data of the case dataset fulfills the rule criteria of the submission rule. The method further includes outputting the case dataset in response to the case data of the case dataset fulfilling the rule criteria of the submission rule.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 5A-5C may be illustrations of some aspects of a user interface generated by the digital PVA management system of FIG. 1 to manage a digital PVA, according to an example embodiment.

FIGS. 6A-6B may be illustrations of some aspects of a digital PVA file generated by the digital PVA management system of FIG. 1, according to an example embodiment.

FIGS. 7A-7D may be illustrations of some aspects of a digital submission ruleset utilized by the digital PVA management system of FIG. 1, according to an example embodiment.

DETAILED DESCRIPTION

Figure 1:
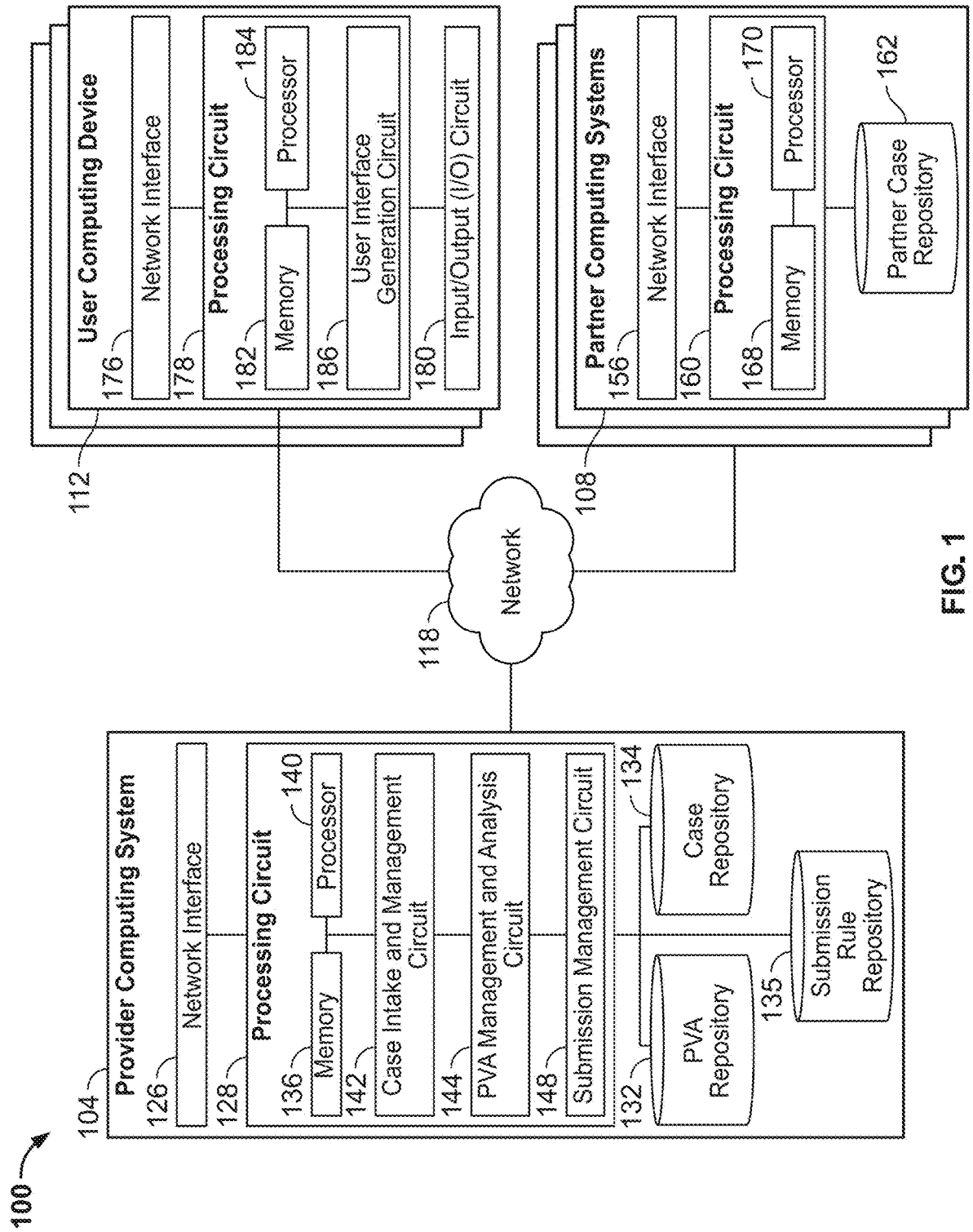
FIG. 1 may be a component diagram of a digital pharmacovigilance agreement (PVA) management system, according to an example embodiment.

Referring generally to the figures, systems and methods for digitally interpreting one or more linguistic sections of a digital PVA file. The systems and methods described herein provide for enhanced intake, interpretation, and execution of digital pharmacovigilance agreements. For example, by receiving a digital PVA, digitally interpreting the digital PVA using artificial intelligence (AI), generating one or more digital jobs or submission rules based on the digital PVA, and then executing the digital jobs, the present systems and methods provide for faster and more accurate execution of the digital PVAs while requiring less user input. In comparison, typical PVA systems may not be setup or specific to PVAs, thereby requiring the user to manually execute the PVAs (e.g., every month on a specific day manually email a list of case datasets, etc.). By contrast, the present systems and methods may receive a digital PVA, and interpret the one or more linguistic sections or clauses of the PVA to generate digital tasks or actions that may be automatically executed by the systems and methods described herein. By doing so, the present systems and methods provide for improved efficiency and time savings by streamlining the entire workflow, eliminating manual data entry, and reducing the time required for processing PVAs.

Further, by utilizing an AI model to interpret the digital PVAs, the present system and method provide for enhanced data accuracy as well as consistency. Manual data entry is prone to errors, which can have significant implications in the context of Pharmacovigilance (e.g., inaccurate reporting, missed cases, etc.). By automating the intake and interpretation of agreements, the present systems and methods minimize data entry mistakes and ensure the accuracy of the digital documents output. Further, the present systems and methods enforce standard processes and guidelines, ensuring consistency in the interpretation and execution of PVAs across different cases. This standardization helps avoid discrepancies and ensures compliance.

Likewise, because the present systems and methods utilize a loaded submission ruleset file including a submission rule to represent the digital file (e.g., the digital PVA), and then activate the submission rule, in response to specific criteria being met, the present systems and methods provide for improved intake, interpretation, and execution of the digital file. For instance, by utilize a loaded submission ruleset to represent the digital file, the present systems and methods provide for improved transparent and simplified execution of the digital file. For instance, because the submission ruleset is received via a submission ruleset file, a clear record of the submission executed rules is maintained, providing a traceable audit log for each agreement. This improves transparency and simplifies compliance audits. Likewise, the submission rules automate the PVA execution process. Once the digital PVA is signed by all parties, the predefined submission rules take over, eliminating manual tasks like data entry, triggering subsequent actions automatically.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact data, case identifier (e.g., case worldwide ID (WWID), case number, etc.), case priority data, case seriousness data, case documents, medical product data, medical product registrations, patient data, and other data associated with a case as defined by the standard ISO/HL7 27953 as well as any past or future standards governing ICSRs of the ISO, the WHO, the FDA, the EMA, or other national health agencies governing ICSRs.

Referring now to FIG. 1, a system 100 for generating and managing a digital PVA is shown, according to an example embodiment. The system 100 includes a provider computing system 104, multiple partner computing systems 108, and multiple user computing devices 112 connected by a secure network (e.g., a network 118).

The network 118 communicably and operably couples the provider computing system 104, the partner computing devices 108, and the user computing devices 108 such that communicable and operable computing may be provided between the provider computing system 104, the partner computing devices 108, and the user computing devices 112 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In some embodiments, the provider computing system 104 may act as a host and provide an application (e.g., a web-based application, a mobile application, etc.) to the user computing devices 112 over the network 118 in response to authenticating the respective computing device. For example, the provider computing system 104 may receive authentication data (e.g., a username and corresponding password, a limited-use key, a two-factor authentication code or key, etc.) from one of the user computing devices 112. The provider computing system 104 may then authenticate the user computing device 112 based on the authentication data and provide an application to the user computing device 112 over the network 118. In some examples, the provider computing system 104 may be a multi-tenant system where various elements of hardware and software may be shared by one or more customers. In a multi-tenant system, a user is typically associated with a particular customer. In one example, a user (e.g., of the user computing device 112) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, an PVA repository 132, a case repository 134, and a submission rule repository 135. In some embodiments, the provider computing system 104 may include an input/output circuit (e.g., similar to (e.g., the same as) an input/output circuit 162 as will described further herein).

The network interface 126 is structured to establish connections with the partner computing devices 108 and the user computing devices 112 by way of the network 118. The network interface 126 includes program logic and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The processing circuit 128, as shown, comprises a memory 136, a processor 140, a case intake and management circuit 142, a PVA management and analysis circuit 144, and a submission management circuit 148. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 140 to control the processing circuit 128. The memory 136 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the case intake and management circuit 142 is structured or configured to receive, generate, store, and manage case datasets. For instance, the case intake and management circuit 142 may be configured or structured to periodically receive or retrieve adverse event data associated with an adverse event from a trusted source (e.g., one of the partner case repositories 162). The case intake and management circuit 142 may then match the adverse event data with medical product data of a medical product repository (not shown), generate a case dataset including case data, and store the case dataset within the case repository 134. In one example, the case intake and management circuit 142 may be an instance of Vault Safety®. In some embodiments, the provider computing system 104 may include multiple case intake and management circuits 140 (e.g., one for each customer, one for each user, etc.). In some embodiments, when generating the case dataset, the case intake and management circuit 142 may further search the case repository 134 for case datasets which may be a duplicate of the newly generated case. In other embodiments, the case intake and management circuit 142 may output (via the network interface circuit 126) one or more of the case datasets as a specific file type (e.g., E2B (R3) XML file, as a Council for International Organizations of Medical Sciences (CIOMS) II PDF file, etc.) to one or more of the partner computing systems 108 or the user computing devices 112. In other embodiments, the submission management circuit 148 outputs the case datasets and/or the digital documents described herein.

Additionally, the case intake and management circuit 142 may be configured or structured to retrieve cases from the case repository, in response to receiving a request including case criteria (e.g., a medical product of the case, a date of the case, a state of the case (e.g., open, closed, submitted, pending review), a country in which the case took place, etc.) from one of the user computing devices 108.

As described herein, the PVA management and analysis circuit 144 is structured or configured to generate and/or receive digital PVA documents and analyze the digital PVA documents for obligations or tasks/jobs defined by the digital PVA. For instance, a first digital PVA may define a case sharing agreement between two pharma companies (e.g., pharma X and Pharma Y). The first digital PVA may include multiple linguistic sections (e.g., sections including multiple specific legal terms and definitions) that define the specifics of the case sharing agreement. The linguistic sections may indicate pharma X is to send any case datasets for a specific medical product (e.g., Drug x) that originated in a specific country(s) (e.g., France) to pharma Y via email (e.g., at a specific electronic or digital address (e.g., pharma Ycaseintake@gmail.com) at a specific frequency (e.g., once a month). Accordingly, the PVA management and analysis circuit 144 may receive the first digital PVA document and digitally interpret the first digital PVA document to generate a digital obligation or jobs. For instance, the PVA management and analysis circuit 144 may generate a digital job to send all case datasets (e.g., of the case repository 134) for Drug X that originated in France to the specific electronic (also referred to as digital) address (e.g., pharmaYcaseintake@gmail.com) on the first day of every month. In other embodiments, the PVA management and analysis circuit 144 may digitally interpret the digital PVA and generate a submission rule.

In another example, a second digital PVA may define an aggregate or periodic report (e.g., a Drug Safety Update Report (DSUR), a Periodic Safety Update Report (PSUR), a Periodic Benefit-Risk Evaluation Report (PBRER), Periodic Adverse Drug Experience Report (PADER), or other periodic pharmacovigilance safety reports) sharing agreement between the two pharma companies. The second digital PVA may also include multiple linguistic sections that define the specifics of the aggregate reporting sharing agreement. The linguistic sections may indicate that pharma Y is to send a specific aggregate report (e.g., the DSUR) for a specific medical product to pharma X via an AS2 Gateway communication (e.g., at a specific IP address) at a specific frequency (e.g., every six months). Accordingly, the PVA management and analysis circuit 144 may each linguistic section of the digital PVA document and generate the second digital PVA document. Then, the PVA management and analysis circuit 144 may receive the digital obligations or jobs associated with each linguistic section for the second digital PVA from one of the user computing device 112. For instance, the PVA management and analysis circuit 144 may receive a digital job to send the DSUR for Drug X to the specific electronic address (e.g., the IP address) on the first day of January and July.

In some embodiments, the processing circuit 128 and/or the PVA management and analysis circuit 144 may include an artificial intelligence (AI) circuit that may use an AI model (e.g., a natural language processing (NLP) model, a large language model (LLM), a semantic text model, etc.) to digitally interpret the linguistic sections of the digital PVA. In one example, the AI circuit may utilize an NLP model to interpret the linguistic sections of the digital PVA and generate the digital tasks. NLP AI models use algorithms and machine learning techniques to analyze and extract meaning from text or speech. They break down sentences into smaller components, such as words or phrases, and identify the relationships between them. This helps them understand the context, sentiment, and intent behind the input. These models can perform various tasks, including language translation, sentiment analysis, text summarization, question answering, and chatbot interactions. In this regard, the PVA management and analysis circuit 144 may use an NLP AI model to interpret the linguistic sections of the PVA and determine a digital document associated with the PVA (e.g., case datasets, an aggregate report, literature of interest, potential safety signals, etc.), a medical product associated with the PVA (e.g., drug X), a country of origin (e.g., France) for the digital document, an electronic communication protocol to provide the digital document (e.g., file transfer protocol (FTP), AS2 Gateway, email, etc.), an electronic address or partner associated with the PVA and the electronic communication (e.g., an IP address, an FTP address, an email address, etc.), and/or a date/time or frequency at which the digital document is to be provided.

In other embodiments, the PVA management and analysis circuit 144 may utilize a LLM to digitally interpret the linguistic sections of the digital PVA. LLMs, such as the GPT-3.5 architecture, are advanced AI systems and models that provide for understanding and generating human language. They are designed to handle a wide range of natural language tasks with accuracy and fluency. These models are trained on vast amounts of text data, including books, articles, websites, and other sources of written information. By learning from this data, they develop an understanding of grammar, syntax, and the nuances of language usage. They can also grasp relationships between words, phrases, and concepts. LLMs work by processing text input and generating relevant and coherent responses. They break down the input into smaller units, such as words or sentences, and analyze the context and meaning behind them. This analysis helps them generate accurate and contextually appropriate output.

In other embodiments, the PVA management and analysis circuit 144 may utilize other AI models (e.g., semantic text models, recurrent neural networks (RNN), convolution neural networks, (CNN), Sequence-to-Sequence models, etc.) to digitally interpret the linguistic sections of the digital PVA and generate one or more digital tasks or jobs.

In some embodiments, the PVA management and analysis circuit 144 may receive the linguistic sections and the digital job from or via one or more of the user computing devices 112. For instance, a user of a user computing device 112 may provide (e.g., via an input device (e.g., a keyboard)) the linguistic section. Then, the PVA management and analysis circuit 144 may receive the digital obligations or jobs from one or more of the user computing devices 112. For instance, the user of the user computing device 112 may generate and provide the digital job (described above) to send the DSUR for Drug X to the specific electronic address (e.g., the IP address) on the first day of January and July. In some embodiments, the user of the user computing device 112 may further specify (e.g., highlight, select, etc.) the linguistic section or clause of the PVA with which the digital job is associated.

In some embodiments, the PVA management and analysis circuit 144 may utilize and the PVA repository 132 may include a PVA template with preapproved or preselected linguistic sections in which the user of one of the user computing devices 112 can select one or more parameters and then generate the PVA. For instance, the user of the user computing device 112 may select a PVA template for a case dataset sharing agreement. Then, via the user computing device 112, the user may select a partner computing system 108 with which the cases are to be shared (which may already be stored in the provider computing system 104), one or more countries for which the PVA is applicable, one or more medical products for which the PVA is appliable, and a timeframe or frequency for which the PVA is applicable. Then, once the user has provided parameters, the provider computing system 104 may generate a digital PVA including the pre-approved linguistic sections and the parameters added into each of the pre-approved linguistic sections. Additionally, based on the parameters, the provider computing system 104 may further generate a digital job associated with the PVA and the parameters (e.g., a digital job for case datasets, the selected medical product, the selected country(s), the selected partner computing system 108, and the selected timeframe or frequency.) In some embodiments, each digital job includes a document parameter, a frequency or timeframe parameter, a medical product parameter, a country parameter, a communication protocol parameter, and/or an electronic address (or partner) parameter. In other embodiments, additional parameters may be included in the digital job (e.g., a second medical product parameter, a start date parameter, an end date parameter, a seriousness parameter, a file size parameter, a substance parameter, etc.) In some embodiments, the communication protocol may define the file type of the communication (e.g., an email communication is to include a PDF file attachment, an AS2 gateway communication is to include an E2B (R3) XML file attachment, etc.). In some embodiments, the system 100 may include another clause or linguist section library or repository (not shown). The clause repository may be external (e.g., not a part of the) the provider computing system 104 and include one or more template or specific linguistic sections. In this regard, the provider computing system 104 may receive a selection of the one or more specific linguistic section and provide a request for each section to the clause repository, in response.

The submission management circuit 148 is structured or configured to output or provide the specified digital document of the PVA to the specified electronic address of the PVA via the communication protocol specified by the PVA (within the timeframe specified by the PVA). For instance, the PVA management and analysis circuit 144 may interpret the digital PVA and generate a digital job to send all case datasets (e.g., of the case repository 134) for Drug X that originated in France to the specific electronic address (e.g., pharmaYcaseintake@gmail.com) on the first day of every month. In response, the submission management circuit 148 may retrieve each case dataset that originated in France and was received/generated within the last month from the case repository 134. Then, at the specified frequency (e.g., on the first day of the month), the submission management circuit 148 may provide the resulting set of case datasets to the email address pharmaYcaseintake@gmail.com via email.

Still referring to FIG. 1, the PVA repository 132 may be repository (e.g., a database) that is structured or configured to receive, store, and manage digital PVAs of users or customers. In this regard, the PVA repository 132 may receive, store, and manage digital PVAs including multiple linguistic sections therein. For example, the PVA management and analysis circuit 144 may receive one or more newly generated multiple linguistic sections from one or more of the user computing devices 112 and generate a digital PVA including each section. Then, the PVA management and analysis circuit 144 may store the newly generated PVA in the PVA repository 132. In some embodiments, the PVA repository 132 may further store one or more PVA templates that may be used in generating new digital PVAs, as described herein. Accordingly, the PVA repository 132 can be structured according to various database types, such as, relational, hierarchical, network, flat, point-in time, and/or object relational. Further, the PVA repository 132 may include a plurality of nonvolatile/non-transitory storage media such as solid-state storage media, hard disk storage media, virtual storage media, cloud-based storage drives, storage servers, and/or the like.

Likewise, the case repository 134 may be repository (e.g., a database) that is structured or configured to receive, store, and manage case datasets and their respective data (e.g., case data, adverse event data, etc.). For example, the case repository 134 may receive case datasets and related case objects and store the case datasets therein. Then, in response to receiving a query or a request for one or more case datasets (e.g., a query for all cases that include a specific medical term and/or code) the case repository 134 may provide and/or return the case datasets stored therein that match the query or request. For example, the case repository 134 may receive a query from the submission management circuit 148 for all cases that include a specific criteria (e.g., a specific medical product, a specific country of origin, a specific date range). In response, the case repository 134 may determine each case dataset that includes the specific criteria stored therein and return each case dataset. Further, the case repository 134 can be structured according to various database types, such as, relational, hierarchical, network, flat, point-in time, and/or object relational. In some embodiments, the case repository 134 includes a plurality of nonvolatile/non-transitory storage media such as solid-state storage media, hard disk storage media, virtual storage media, cloud-based storage drives, storage servers, and/or the like.

Similarly, the submission rule repository 135 may be repository (e.g., a database) that is structured or configured to receive, store, and manage submission rules and their respective data (e.g., submission rule priority, submission rule trigger, submission rule timeframe, submission rule case criteria, etc.). For example, the submission rule repository 135 may receive submission rules and related case objects and store the submission rules therein. Then, in response to a specific rule trigger being met or fulfilled, the submission rule repository 135 may receive a request for the submission rule and/or provide the submission rule to the submission management circuit 148. The submission rule repository 135 can be structured according to various database types, such as, relational, hierarchical, network, flat, point-in time, and/or object relational. In some embodiments, the submission rule repository 135 includes a plurality of nonvolatile/non-transitory storage media such as solid-state storage media, hard disk storage media, virtual storage media, cloud-based storage drives, storage servers, and/or the like.

While not shown, in some embodiments, the provider computing system 104 may include a separate repository for each data or document type described herein. For instance, the provider computing system 104 may include the case repository 134, the submission rule repository 135, the PVA repository 132, an aggregate report repository (not shown), a literature repository (not shown), a partner repository (for storing electronic (or digital) addresses, communication protocols, and the like associated with partner computing systems 108) (not shown), a study repository (not shown), a medical product repository (not shown), and the like.

Still referring to FIG. 1, the partner computing systems 108 may be managed by third-party partners (e.g., the FDA, the EHA, Health Canada, partner company 1, partner company 2, partner computing system xyz, etc.) and can be or include a computing device or system configured to communicate with the provider computing system 104 over the network 118. For instance, the partner computing systems 108 can be a server computer system, a gateway computing system, a laptop computer a desktop computer, and any other network-connected device that can communicate over the network 118. For example, one of the partner computing systems 108 may be the Electronics Submission Gateway (ESG) of the FDA through which one or more E2B XML files may be received from and/or provided to. In another example, one of the partner computing systems 108 may be a laptop computer operated by an employee of a partner company.

In operation, the partner computing systems 108 may communicate with the provider computing system 104 or the user computing device 112 to send and/or receive one or more electronic communications. For instance, a customer (e.g., pharma company 123) may have a case sharing agreement with partner company 1, which is associated with a first partner computing system 108. Accordingly, the provider computing system 104 may provide case datasets to the first partner computing system (e.g., once a month, once a day, etc.). For instance, the provider computing system 104 (and more specifically the submission management circuit 148) may generate an outbound transmission including multiple case datasets (e.g., all of the case datasets for the last month). Then, the provider computing system 104 may output the outbound transmission to the first partner computing system 108.

As shown, each partner computing system 108 includes a network interface 156, a processing circuit 160, and a partner case repository 162. In some embodiments, each partner computing system 108 further includes a key repository (not shown) for storing AS2 keys and certificates.

The network interface 156 is structured to establish connections with the provider computing system 104 and/or the user computing device 112 by way of the network 118. The network interface 156 includes program logic and/or hardware-based components that connect each partner computing system 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The processing circuit 160, as shown, comprises a memory 168 and processor 170. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The partner case repository 162 may be similar or the same as the case repository 134 and is a repository (e.g., a database, cloud storage, etc.) that is structured or configured to receive, store, and manage case datasets associated with adverse events. For example, one of the partner computing systems 108 may receive a case dataset from the provider computing system 104 and store case dataset in the partner case repository 162. Further, the partner case repository 162 can be structured according to various database types, such as relational, hierarchical, network, flat, point-in time, and/or object relational. In some embodiments, the partner case repository 162 includes a plurality of nonvolatile/non-transitory storage media such as solid-state storage media, hard disk storage media, virtual storage media, cloud-based storage drives, storage servers, and/or the like.

Still referring to FIG. 1, the user computing devices 112 can each be any type of computing device or computing system. For instance, each user computing device 112 can be one or more of a mobile phone, a tablet computer, a laptop computer, a smart watch, a server computer system, or any other internet-connected device. In operation, the user computing devices 112 may communicate and interface with the provider computing system 104 via the network 118 to provide the PVA and/or selections of one or more of the properties of the PVA. As shown, each user computing device 112 may include a network interface 176, a processing circuit 178, and the input/output (I/O) circuit 180.

The network interface 176 is structured to establish connections with the provider computing system 104 by way of the network 118. The network interface 176 includes program logic and/or hardware-based components that connect the user computing device 112 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 176, as shown, comprises a memory 182, a processor 184, and a user interface generation or rendering circuit 186. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 176. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

The user interface rendering circuit 186 may be configured to receive a user interface (e.g., a web interface in an HTML file and related files, a downloaded graphical user interface, etc.) from the provider computing system 104 and render the user interface on the user computing device 112 via the I/O circuit 180. In this way, the provider computing system 104 may generate one or more user interfaces and provide the one or more user interfaces to the user interface generation circuit 186 to be rendered on the user computing device 112 (e.g., on a display of the I/O circuit 180 of the user computing device 186).

The I/O circuit 180 is structured to receive communications from and provide communications to the user of the user computing device 112 (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input/output devices described herein.

Figure 2:
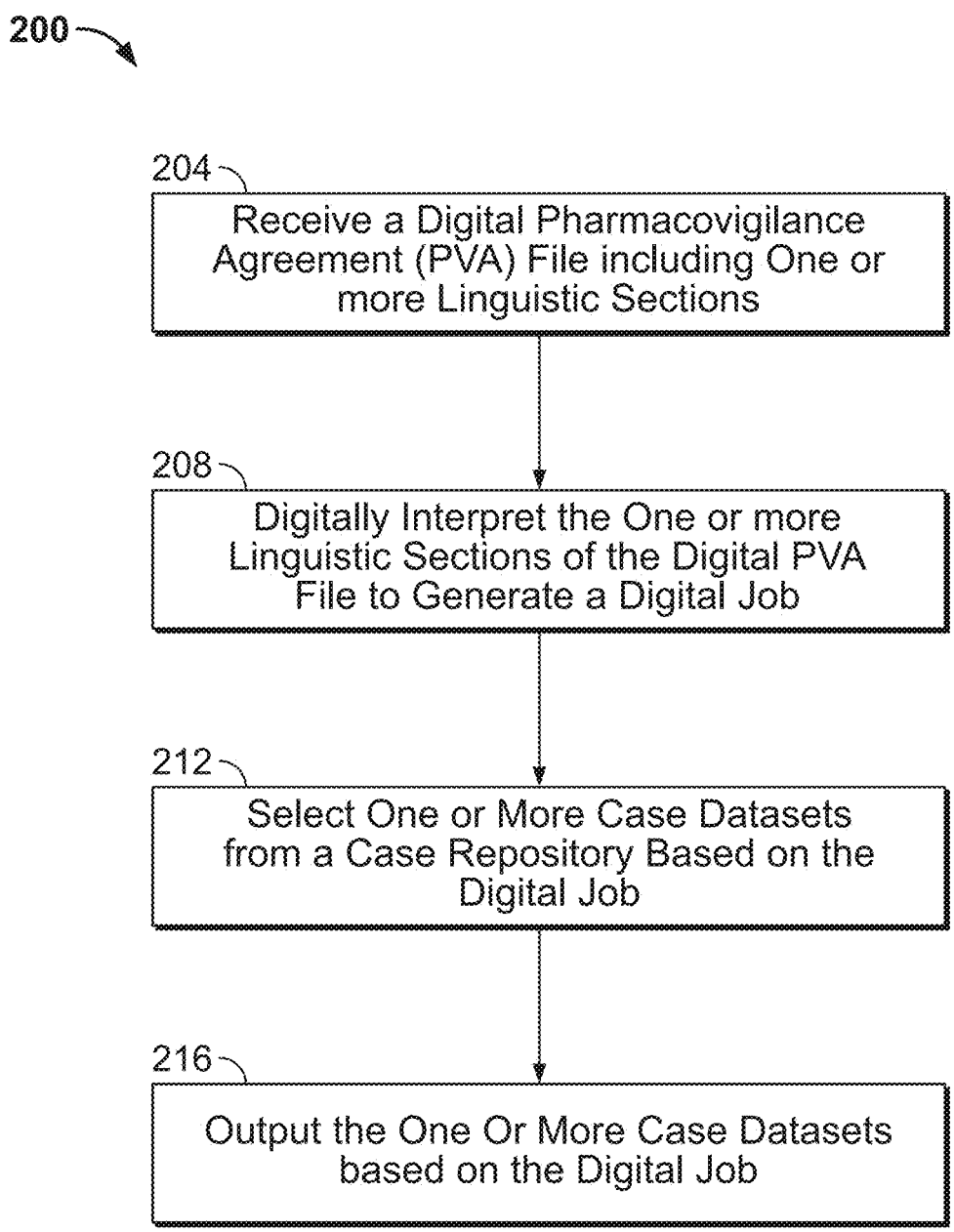
FIG. 2 may be a flow diagram of a method for automatically executing a digital PVA, according to an example embodiment.

Referring now to FIG. 2, a method 200 of automatically executing a digital PVA is shown, according to an example embodiment. Method 200 may be carried out by the system of FIG. 1. More particularly, the method 200 may be carried out by the processing circuit 128 of the provider computing system 104 and through communication with the partner computing systems 108 and the user computing devices 112.

Method 200 commences at step 204 at which the provider computing system 104 receives a digital PVA file (e.g., a PDF file, a Word Document file, an XML file, etc.) including one or more linguistic sections or clauses. As described herein, a Pharmacovigilance Agreement or PVA may be a formal agreement between pharmaceutical companies or marketing authorization holders (MAHs) and regulatory authorities, such as health agencies or drug regulatory agencies, to ensure the monitoring, reporting, and assessment of the safety profile of a medical product after it has been authorized and made available in the market. A PVA may be typically utilized to facilitate the systematic collection, evaluation, and reporting of information related to the medical product (e.g., case datasets) throughout its lifecycle.

Additionally, each linguistic section of the digital PVA may be a text section or clause including legal language or terms that define the PVA. In one example, a digital PVA may include a definitions linguistic section or clause which defines specific terms used in the digital PVA; a safety data exchange linguistic section or clause, a reporting requirements linguistic section which may define the specific obligations and timelines for the submission of safety-related information by one of the pharma companies to the regulatory authority; a data exchange and communication linguistic section that outlines the mechanisms and channels through which the pharma companies will exchange safety data, including electronic reporting systems and communication protocols; a signal detection and evaluation linguistic section that may specify the procedures for the detection, evaluation, and management of signals, which are potential safety concerns associated with the use of the medical product. It may include protocols for signal detection activities, such as data mining, literature screening, and other proactive safety surveillance methods; a risk management plan (RMP) linguistic section that may address the development and implementation of a Risk Management Plan for the medical product. The RMP outlines specific measures and interventions to minimize identified risks and maximize the benefits of the product; an aggregate report linguistic section that may include provisions for the submission of and sharing of aggregate reports (e.g., PSURS); a compliance and audits linguistic section that may outline the processes for monitoring compliance with pharmacovigilance obligations and the conduct of audits to ensure adherence to regulatory requirements. This helps ensure the quality and integrity of safety data collected and reported; and/or a confidentiality and data protection linguistic section that may address the confidentiality and data protection aspects related to the exchange of information between the pharma companies, ensuring compliance with applicable privacy regulations and safeguarding sensitive data.

In some embodiments, the digital PVA file may be received from one of the user computing devices 112 or one of the partner computing systems 108 and include one or more digital signatures (e.g., a first digital signature and a second digital signature). Digital signatures may be a are a cryptographic mechanism used to verify the authenticity, integrity, and non-repudiation of digital documents. They provide a way to ensure that a digital object has not been altered since it was signed and that the signer cannot deny their involvement. In other embodiments, the digital PVA file may be received from the user computing device 112 and the user computing device 112 may provide a digital signature to sign the digital document. In some embodiments, after receiving the digital signature from the user computing device 112, the provider computing system 104 may provide the digital PVA to one of the partner computing systems 108 (e.g., as specified by the digital PVA) for a second digital signature. Then, in response, the provider computing system 104 may receive the digital PVA including the second digital signature.

In some embodiments, after receiving the digital PVA, the provider computing system 104 may store the digital PVA in the PVA repository 132 in association with a specific medical product and/or clinical study. For instance, if the digital PVA is associated with the medical product Drug X (as defined by the PVA or the user of the user computing device 112 that provided the digital PVA, the provider computing system 104 may store the digital PVA in the PVA repository 132 in association with (e.g., queryable by) Drug X.

Once the provider computing system 104 has received the digital PVA, the method 200 proceeds to step 208 at which the provider computing system 104 digitally interprets (or analyzes) the one or more linguistic sections of the digital PVA. As described herein, to digitally interpret the linguistic sections of the digital PVA, the provider computing system 104 may utilize AI models or methodologies (e.g., a LLM, an NLP model, a semantic text model, etc.) to analyze the linguistic sections of the digital PVA and determine the obligations or digital jobs defined by the digital PVA. In one example, a digital PVA may be a literature sharing agreement between a first pharma company and a second pharma company. The digital PVA may indicate, in the one or more linguistic sections, that all literature associated with a specific medical product is to be sent, as a PDF file, on the first of every month to a specific email address. Accordingly, the provider computing system 104 may digitally interpret the digital PVA using a LLM and generate a first digital job based on the digital interpretation. The digital job may provide for the outputting all literature with a modified or loaded date within the last month, as PDF files, on the first day of the month to the specific email.

In some embodiments, the provider computing system 104 may generate multiple digital jobs (e.g., a first digital job and a second digital job) based on the linguistic sections of the digital PVA. For instance, a PVA may specify a case dataset sharing agreement including multiple parameters thereof and a literature sharing agreement including parameters thereof. Accordingly, based on the linguistic sections of the digital PVA, the provider computing system 104 may generate a first digital job to share case datasets and a second digital job to share literature.

In some embodiments, the provider computing system 104 may utilize an AI model to analyze the linguistic sections of the digital PVA and determine a confidence level or interval associated with the resulting parameters of the PVA or digital job (e.g., the document(s) of the digital job, the frequency of the digital job, the communication protocol and/or file type of the digital job, the electronic address of the digital job, etc.). For instance, the provider computing system 104 may analyze the digital PVA and determine the documents of the digital job are case datasets with a corresponding 98% confidence level; the frequency of the digital job is once a month on the first of every month with a corresponding 90% confidence level; the communication protocol is email with a corresponding 98% confidence level; and the electronic address of the digital job is 123intake@gmail.com with a 99% confidence level. Then, based on a confidence threshold (e.g., 95%), the provider computing system 104 may generate a digital job including all of the parameters that have a 95% confidence level or greater (e.g., every parameter but the frequency of the digital job). Further, for each parameter that does not meet the confidence threshold (i.e., missing or incomplete parameters), the provider computing system 104 may generate a notification (e.g., an email, an alert, etc.) and provide the notification to one of the user computing devices 112 for display thereon. Further, the provider computing system 104 may receive the missing or incomplete parameters from the user computing device 112 and modify the digital job to include the received parameter. In some embodiments, if the digital job includes a full set of parameters with a confidence interval about the threshold, the provider computing system 104 may automatically process the digital job (e.g., proceed to step 212). In some embodiments, if the digital job does not include a full set of parameters with a confidence interval about the threshold, the provider computing system may wait to process the digital job (e.g., proceed to step 212) until the user computing device 112 provides any missing or incomplete parameters. In some embodiments, the confidence threshold may be received by the provider computing system 104 from one of the user computing devices 112 or an admin computing device (not shown).

In some embodiments, prior to digitally interpreting the linguistic sections of the digital PVA, the provider computing system 104 may transform the digital PVA file from a first file or data type to a second file or data type. For example, a digital PVA may be received as a PDF file. However, before digitally interpreting the linguistic sections of the PVA, the provider computing system 104 may transform the digital PVA from a PDF file to a Word file or a text document (.txt) file type. For instance, the provider computing system 104 may include an optical character recognition (OCR) circuit (not shown) to extract text from the PDF file.

In some embodiments, after generating the digital job at step 208 but prior to processing the digital job at step 212, the provider computing system 104 may receive a request from one of the user computing devices 112 to process or activate the digital job. For instance, the provider computing system 104 may receive a job activation request identifying the digital job and indicating the provider computing system 104 is to process the digital job at the frequency specified therein.

Once the provider computing system 104 has digitally interpreted the linguistic sections of the digital PVA and generated the digital job, the method 200 proceeds to step 212 at which the provider computing system 104 selects one or more case datasets from the case repository 134 based on the digital job. As described herein, the digital job may include one or more parameters (e.g., the medical product parameter, the country parameter, the seriousness parameter, the frequency parameter, etc.) that define case criteria. For instance, the digital job may include a first parameter of the country USA, a second parameter of the medical product Drug X, and a frequency of once a month. Accordingly, at step 212, the provider computing system 104 may query or select case datasets from the case repository 134 that match the first parameter, the second parameter, and the third parameter (e.g., all the cases datasets from the past month for Drug X that originated in the USA).

In some embodiments, at step 212, the provider computing system 104 may not select case datasets, but may rather select other digital documents or data objects identified by the digital PVA. For instance, if the PVA identifies the digital document as a specific aggregate report (e.g., a PSUR) and the digital job includes the document parameter of PSUR, the provider computing system 104 may query or select the corresponding PSUR from the aggregate report repository (not shown) that matches the parameters of the digital job (e.g., the PSUR for the last six months for Drug X in the USA). In this regard, the digital document type selected at step 212 may vary based on the document parameter of the digital job.

Once the provider computing system 104 has selected the one or more case datasets from the case repository 134, the method 200 proceeds to step 216 at which the provider computing system 104 outputs the selected one or more case datasets to one of the partner computing systems 104 based on the digital job. As described herein, the digital job may include one or more parameters (e.g., the electronic address parameter and the communication protocol parameter) that define the digital submissions which are to be output based on the digital job. For instance, the digital job may include a communication protocol parameter of email and an electronic address parameter of intake123@gmail.com, which may be associated with a first partner computing system 108. Accordingly, at step 216, the provider computing system 104 may generate an email including the case datasets as a part thereof (e.g., as CIOMS II PDF attachments) and output the generated email to the email address intake123@gmail.com. In another example, the digital job may include a communication protocol parameter of AS2 Gateway communication and an electronic address parameter of a first IP address, which may be associated with a second partner computing system 108. Accordingly, at step 216, the provider computing system 104 may generate an AS2 gateway transmission including the case datasets as a part thereof (e.g., as E2B XML (R2) attachments) and output the generated AS2 Gateway transmission to the specified IP address.

In some embodiments, steps 212 and 216 may be repeated, by the provider computing system 104, at the frequency specified in the frequency parameter of the digital job. For instance, if the frequency parameter is once a month, the provider computing system 104 may repeat steps 212 and 216 once a month. In some embodiments, these steps may repeat until the end date parameter of the digital job is reached. For instance, steps 212 and 216 may repeat once a month until an end date parameter (e.g., Jul. 1, 2025) is reached (e.g., until Jul. 1, 2025). In some embodiments, steps 212 and 216 may be further repeated, by the provider computing system 104, for each digital job generated by the provider computing system 104 at step 208. For instance, if at step 208, the provider computing system 104 generates a first digital job, a second digital job, and a third digital job, steps 212 and 216 may be repeated for each digital job.

Figure 3:
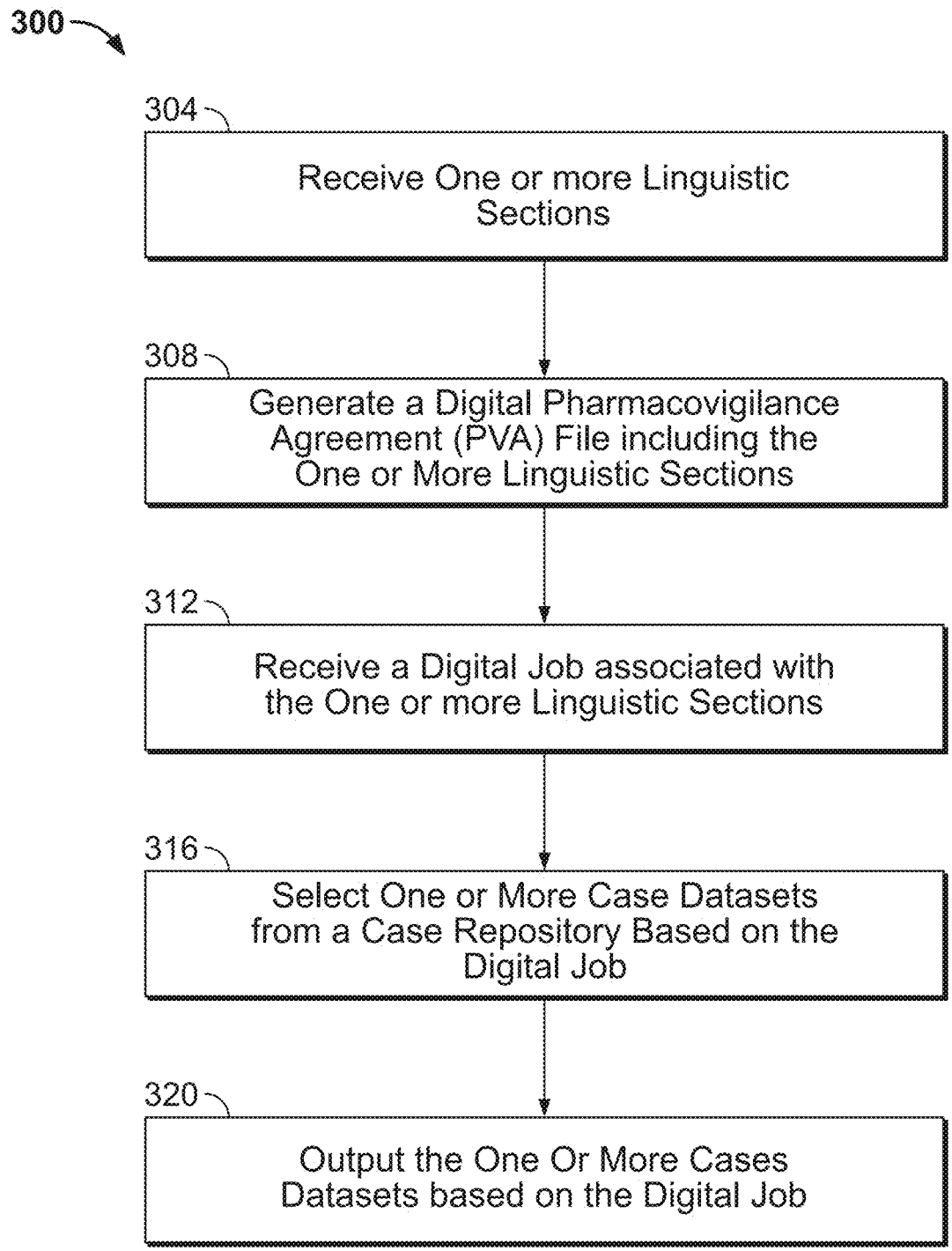
FIG. 3 may be a flow diagram of a method for generating and executing a digital PVA, according to an example embodiment.

Referring now to FIG. 3, a method 300 of generating and executing a digital PVA is shown, according to an example embodiment. While different overall, it should be understood that any steps or discussion of the method 300 may be applied or included within the method 200 and 400, and vice versa, and that such combinations are included within the scope of the present disclosure. For example, the method 200 may include any of the steps 304-320, after or before any steps included in the method 200, and the method 300 may include any of the steps 204-216 after or before any of the steps included in the method 300. Likewise, the method 300 may include any of the steps 404-428, after or before any steps included in the method 300, and the method 400 may include any of the steps 304-320 after or before any of the steps included in the method 400. Method 300 may be carried out by the system of FIG. 1. More particularly, the method 300 may be carried out by the processing circuit 128 of the provider computing system 104 and through communication with the user computing devices 112 and/or the partner computing systems 108. In this regard, the terms "digital job" and "submission rule" may be interchangeable such that discussion pertaining to the digital jobs of the methods 200 and 300 may be applied to the submission rules of the method 400, and vice versa. Accordingly, the "parameters" of the digital job may correspond or be the same as the "submission rule data" described herein, and vice versa. In this regard, each digital job may refer to a specific single submission of the case dataset (or other document) by the provider computing system 104, whereas each submission rule may refer to a repeatable or reproducible submission of the case dataset (or other document described herein). For instance, as described herein, each digital job may pertain to the single submission of the case dataset, whereas each submission rule may result in multiple submissions of multiple case datasets, in response to the case dataset meeting the rule trigger and/or rule criteria.

Method 300 commences at step 304 at which the provider computing system 104 receives one or more linguistic sections from one of the user computing devices 112. In some embodiments, the linguistic sections may be generated, by the user computing device 112, and provided to the provider computing system 104. In some embodiments, the linguistic sections may be generated, via a user interface generated by the provider computing system 104, and provided to the user computing device 112 for rendering thereon. For instance, the provider computing system 104 may provide a template digital PVA including one or more linguistic sections for display on a user interface of the user computing device 112. Then, the user, via the I/O circuit 180 may provide user input to edit or add to the one or more linguistic sections of the template digital PVA. Then, the user computing device 112 may send the modified PVA including the one or more modified linguistic sections to the provider computing system 104 for storage therein as a digital PVA. In another example, the provider computing system 104 may provide a blank text document to the user computing device 112 for displaying on a user interface. Then, the user, via the I/O circuit 180 may provide input and generate one or more linguistic sections. Then, the user computing device 112 may send the generated linguistic sections to the provider computing system 104 for generation as a digital PVA and storage therein.

In some embodiments, at step 304, the provider computing system 104 may receive multiple linguistic sections of a digital PVA, from multiple, different user computing devices 112. For instance, the provider computing system 104 may receive a first linguistic section of a first digital PVA from a first user computing device 112. Then, the provider computing system 104 may receive a second linguistic section and a third linguistic section of the first digital PVA from a second user computing device 112. Then, the provider computing system 104 may receive a third linguistic section of the first digital PVA from a third user computing device 112.

In some embodiments, at step 304, the user computing device 112 may not provide the linguistic sections of the digital PVA, but may instead provide the one or more parameters of the digital PVA/the digital jobs and a selection of a PVA template. For instance, at step 304, the provider computing system 104 may receive a document parameter, a frequency or timeframe parameter, a medical product parameter, a country parameter, a communication protocol parameter, and/or an electronic address (or partner) parameter from the user computing device 112. Then, at step 308, the provider computing system 104 may modify the PVA template to include the one or more parameters (e.g., in the linguistic sections) and store the modified PVA template. Further, at step 312, the provider computing system 104 may generate the digital jobs including the one or more parameters received at step 304.

Once the provider computing system 104 has received the one or more linguistic sections, the method 300 proceeds to step 308 at which the provider computing system 104 generates a digital PVA file including the one or more linguistic sections. In some embodiments, after generating the digital PVA, the provider computing system 104 may store the digital PVA in the PVA repository 132. In some embodiments, at step 308, the provider computing system 104 may generate a file wrapper or folder and store the folder in the PVA repository 132.

In some embodiments, after step 308 and generating the digital PVA, the user computing device 112 may provide a digital signature to the provider computing system 104 to sign the digital document. In some embodiments, after receiving the digital signature from the user computing device 112, the provider computing system 104 may provide the digital PVA to one of the partner computing systems 108 (e.g., as specified by the digital PVA) for a second digital signature. Then, in response, the provider computing system 104 may receive the digital PVA including the second digital signature.

Once the provider computing system 104 has generated the digital PVA, the method 300 proceeds to step 312 at which the provider computing system 104 receives a digital job associated with the one or more linguistic sections from the user computing device 112. In some embodiments, the digital job(s) may be received from the user computing device 112 via a PVA page 500 described further herein. For instance, the provider computing system 104 may generate the PVA page 500 based on the digital PVA generated at step 308 (e.g., based digital PVA data (e.g., the name of the PVA, the linguistic sections of the PVA, the medical product of the PVA, the studies of the PVA, the partner(s) of the PVA, and so on) and provide the PVA page 500 to one of the user computing devices 112 for rendering and display thereon. Then, via the PVA page 500, the user may provide one or more digital jobs associated with the one or more linguistic sections to the user computing device 112, which may provide them to the provider computing system 104.

In some embodiments, the digital job(s) may be received prior to step 308 (e.g., with the one or more linguistic sections at step 304). For instance, the user computing device 112 may provide a linguistic section and/or a digital job associated with the linguistic section.

Once the provider computing system 104 has received the digital job(s), the method 300 proceeds to step 316 at which the provider computing system 104 selects one or more case datasets from the case repository 134 based on the digital job. As described herein, the digital job may include one or more parameters (e.g., the medical product parameter, the country parameter, the seriousness parameter, the frequency parameter, etc.) that define case criteria. For instance, the digital job may include a first parameter of the country USA, a second parameter of the medical product Drug X, and a frequency of once a month. Accordingly, at step 316, the provider computing system 104 may query or select case datasets from the case repository 134 that match the first parameter, the second parameter, and the third parameter (e.g., all the cases datasets from the past month for Drug X that originated in the USA).

In some embodiments, at step 316, the provider computing system 104 may not select case datasets, but may rather select other digital documents or data objects identified by the digital PVA. For instance, if the PVA identifies the digital document as a specific aggregate report (e.g., a PSUR) and the digital job includes the document parameter of PSUR, the provider computing system 104 may query or select the corresponding PSUR from the aggregate report repository (not shown) that matches the parameters of the digital job (e.g., the PSUR for the last six months for Drug X in the USA). In this regard, the digital document type selected at step 316 may vary based on the document parameter of the digital job.

Once the provider computing system 104 has selected the one or more case datasets from the case repository 134, the method 300 proceeds to step 320 at which the provider computing system 104 outputs the selected one or more case datasets to one of the partner computing systems 104 based on the digital job. As described herein, the digital job may include one or more parameters (e.g., the electronic address parameter and the communication protocol parameter) that define the digital submissions which are to be output based on the digital job. For instance, the digital job may include a communication protocol parameter of email and an electronic address parameter of intake123@gmail.com, which may be associated with a first partner computing system 108. Accordingly, at step 320, the provider computing system 104 may generate an email including the case datasets as a part thereof (e.g., as CIOMS II PDF attachments) and output the generated email to the email address intake123@gmail.com. In another example, the digital job may include a communication protocol parameter of AS2 Gateway communication and an electronic address parameter of a first IP address, which may be associated with a second partner computing system 108. Accordingly, at step 320, the provider computing system 104 may generate an AS2 gateway transmission including the case datasets as a part thereof (e.g., as E2B XML (R2) attachments) and output the generated AS2 Gateway transmission to the specified IP address.

Figure 4:
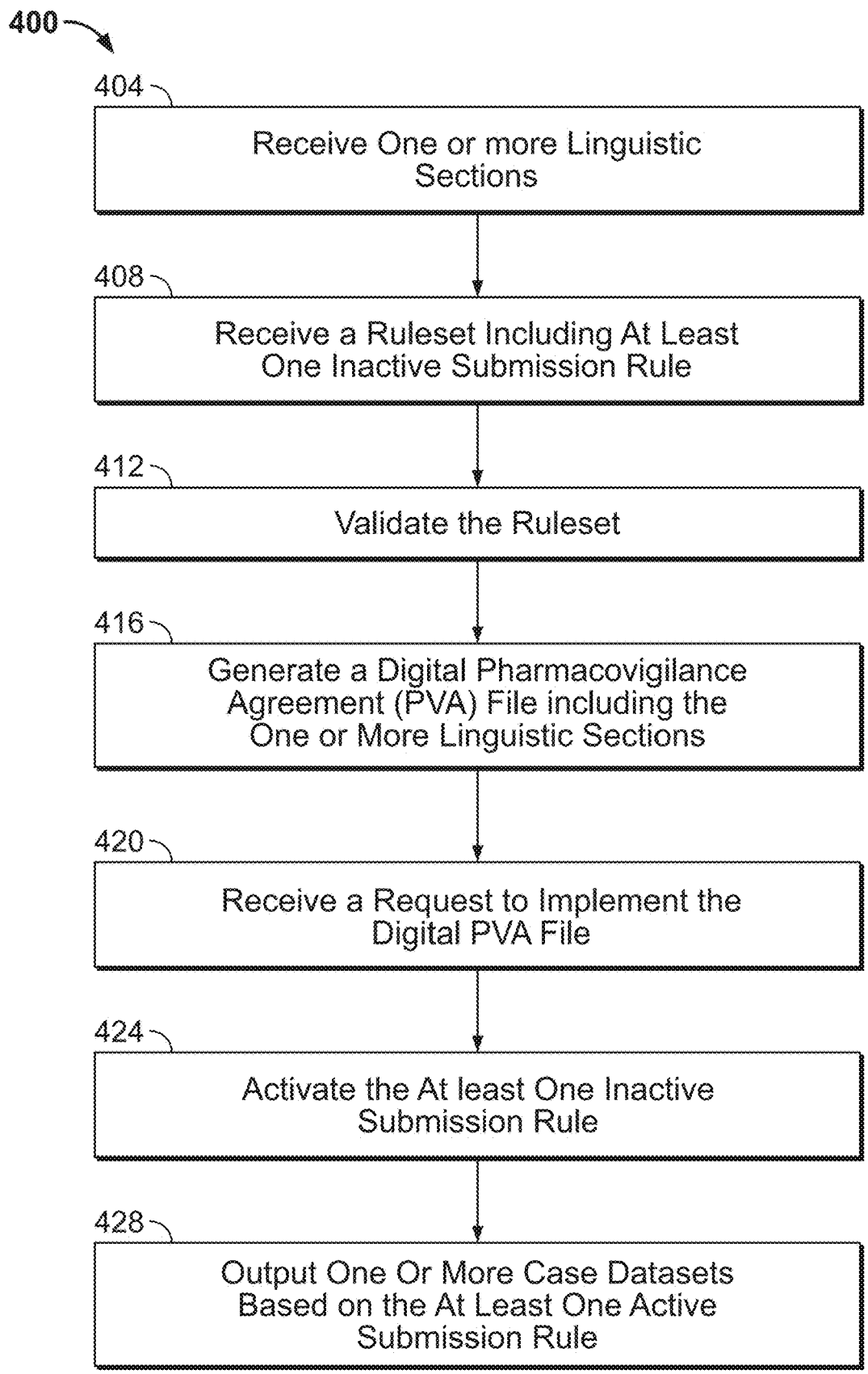
FIG. 4 may be a flow diagram of a method for generating and executing a digital PVA via a submission ruleset, according to an example embodiment.

In some embodiments, steps 316 and 320 may be repeated, by the provider computing system 104, at the frequency specified in the frequency parameter of the digital job. For instance, if the frequency parameter is once a month, the provider computing system 104 may repeat steps 316 and 320 once a month. In some embodiments, these steps may repeat until the end date parameter of the digital job is reached. For instance, steps 316 and 320 may repeat once a month until an end date parameter (e.g., Jul. 1, 2025) is reached (e.g., until Jul. 1, 2025). In some embodiments, steps 316 and 320 may be further repeated, by the provider computing system 104, for each digital job received by the provider computing system 104 at step 312. For instance, if at step 312, the provider computing system 104 receives a first digital job, a second digital job, and a third digital job, steps 316 and 320 may be repeated for each digital job. Referring now to FIG. 4, a method 400 of generating and executing a digital PVA is shown, according to an example embodiment. Method 400 may be carried out by the system of FIG. 1. More particularly, the method 400 may be carried out by the processing circuit 128 of the provider computing system 104 and through communication with the user computing devices 112 and/or the partner computing systems 108.

Method 400 commences at step 404 at which the provider computing system 104 receives one or more linguistic sections from one of the user computing devices 112. In some embodiments, the linguistic sections may be generated, by the user computing device 112, and provided to the provider computing system 104. In some embodiments, the linguistic sections may be generated, via a user interface generated by the provider computing system 104, and provided to the user computing device 112 for rendering thereon. For instance, the provider computing system 104 may provide a template digital PVA including one or more linguistic sections for display on a user interface of the user computing device 112. Then, the user, via the I/O circuit 180 may provide user input to edit or add to the one or more linguistic sections of the template digital PVA. Then, the user computing device 112 may send the modified PVA including the one or more modified linguistic sections to the provider computing system 104 for storage therein as a digital PVA. In another example, the provider computing system 104 may provide a blank text document to the user computing device 112 for displaying on a user interface. Then, the user, via the I/O circuit 180 may provide input and generate one or more linguistic sections. Then, the user computing device 112 may send the generated linguistic sections to the provider computing system 104 for generation as a digital PVA and storage therein.

In some embodiments, at step 404, the provider computing system 104 may receive multiple linguistic sections of a digital PVA, from multiple, different user computing devices 112. For instance, the provider computing system 104 may receive a first linguistic section of a first digital PVA from a first user computing device 112. Then, the provider computing system 104 may receive a second linguistic section and a third linguistic section of the first digital PVA from a second user computing device 112. Then, the provider computing system 104 may receive a third linguistic section of the first digital PVA from a third user computing device 112.

Once the provider computing system 104 has received the linguistics sections, the method 400 proceeds to step 408 at which the provider computing system 104 receives a ruleset including at least one inactive submission rule. As described herein, each submission ruleset may include the instances or conditions of a case dataset in which the case dataset is to be output. For instance, a first partner ruleset may specify the instances or conditions of a specific case dataset in which the case dataset is to be output to a partner computing system 108 associated with the partner. Further, each submission ruleset may include multiple submission rules that each include the conditions in which the case dataset is to be submitted to the partner computing system 108 and submission details (e.g., submission timeframe, submission address, etc.). For instance, the first partner ruleset may include two inactive submission rules: a first submission rule and a second submission rule.

Likewise, each submission rule may include multiple rule criteria and/or a rule trigger. The rule criteria may define specific case fields (e.g., seriousness is "serious-resulted in death," the medical product is drug x, expectedness is unexpected, relatedness is related, and other specific case fields described herein) which are to be met or have occurred for the rule criteria to be fulfilled. In one example, a first submission rule may include three rule criteria including a seriousness of "serious-resulted in death," an adverse event of "Hip Pain," and a medical product of "Drug X." In some embodiments, each submission rule of the submission ruleset may include an order or rank, that defines the order in which the submissions rules are selected and processed by the provider computing system 104, as will be described further herein.

The rule trigger may be an event or change in the case data that indicates the rule is triggered, and the provider computing system 104 is to determine if the rule is fulfilled. For instance, the rule trigger may include a specific state of a case dataset (e.g., completed, submitted, new, data entry required, a QC stage, etc.), a specific period of time (e.g., every minute, every five minutes, once a year on January 1, etc.)), and/or a specific date/time (e.g., Jan. 1, 2021). In one example, in response to the case dataset entering or reaching a specific state (e.g., the stage or state of the case dataset being modified to the state), the provider computing system 104 may determine the rule trigger is met and determine if the case data fulfills the rule criteria of the rule.

In some embodiments, the submission ruleset (and/or each submission rule) may be received from one of the partner computing systems 108 or the user computing devices 112. In some embodiments, the submission ruleset may be received in a submission ruleset file (e.g., an Excel file, a Comma Separated Value (CSV) file, an OpenDocument Spreadsheet (ODS) file, a PDF file, a .DOCX file, or other digital file types). FIGS. 7A-7D show an example submission ruleset file 700 as an Excel file. In some embodiments, the submission ruleset may be received from one of the user computing devices 112 via a user interface (e.g., the PVA page 500). In some embodiments, the submission ruleset may be received at step 404. For instance, at step 404, the provider computing system 104 may receive the linguistic sections of the PVA and the submission ruleset (e.g., together via the user interface).

In some embodiments, the received submission rules of the submission ruleset may be set or include an lifecycle parameter or field that is set to inactive. In other embodiments, the provider computing system 104 may set the lifecycle parameter or field of the submission rules to inactive, such that they will not be used to generate submissions for case datasets. In some embodiments, the submission ruleset may include a start date and end date based on the PVA.

In some embodiments, the provider computing system 104 may generate the submission ruleset based on the linguistic sections of the digital PVA. For instance, as described herein, the provider computing system 104 may analyze the linguistic sections of the digital PVA and determine a confidence level or interval associated with the portions of the submission rule (e.g., the submission rule start date, the submission rule end date, the rule criteria, the rule trigger, the timeframe of the rule, the digital address to which the case datasets are to be output, etc.). For instance, the provider computing system 104 may analyze the digital PVA and determine the submission rule start date is Jan. 1, 2024 with a corresponding 98% confidence level; the submission rule end date is Jan. 1, 2027 with a corresponding 98% confidence level; the rule criteria of the submission rule include a first rule criteria, a second rule criteria, and a third rule criteria with a corresponding 90% confidence level; and the timeframe of the submission is 30 days with a corresponding 99% confidence level. Then, based on a confidence threshold (e.g., 90%), the provider computing system 104 may generate the submission rule including all of the submission rule data that has a 95% confidence level or greater (e.g., every piece of submission rule data). In comparison, for each parameter or piece of data that does not meet the confidence threshold (i.e., missing or incomplete parameters), the provider computing system 104 may generate a notification (e.g., an email, an alert, etc.) and provide the notification to one of the user computing devices 112 for display thereon. Further, the provider computing system 104 may receive the missing or incomplete data from the user computing device 112 and modify the digital job to include the received parameter. In some embodiments, if the submission rule includes a full set of data with a confidence interval about the threshold, the provider computing system 104 may automatically generate the submission rule. In some embodiments, if the submission rule does not include a full set of data with a confidence interval about the threshold, the provider computing system may wait to generate the submission rule until the user computing device 112 provides any missing or incomplete data. In some embodiments, the confidence threshold may be received by the provider computing system 104 from one of the user computing devices 112 or an admin computing device (not shown).

Once the provider computing system 104 has received the submission ruleset, the method 400 proceeds to step 412 at which the provider computing system 104 validates the submission ruleset. For instance, at step 412, the provider computing system 104 may determine each submission rule of the submission ruleset includes the correct data records, fields, and formatting. In one example, the provider computing system 104 may determine the submission rule includes at least one rule criteria, a priority or ranking, and/or a timeframe. For instance, the received submission ruleset may include three submission rules including a first submission rule, a second submission rule, and a third submission rule. The provider computing system 104 may determine that each submission rule includes at least one rule criteria, a priority, and a timeframe. In response to each submission rule including each, the provider computing system 104 may validate the submission ruleset. In comparison, in response to at least one submission rule not including a rule criteria, a priority, or a timeframe, the provider computing system 104 may not validate (i.e., reject) the submission ruleset. In some embodiments, the method 400 may then end. In other embodiments, the provider computing system 104 may proceed with the method 400 for each validated submission rule and discard the unvalidated submission rules. In some embodiments, the provider computing system 104 may generate a notification indicating the ruleset was not validated.

In some embodiments, at step 412, the provider computing system 104 may validate each submission rule by determining whether the rule criteria are each formatted correctly. For instance, the provider computing system 104 may determine whether the rule criteria of the submission rule includes the correct syntax, composition, and data references. In one example, a submission rule may include an incorrect data reference (e.g., "case_produc3_v" in place of "case_product_v"). Accordingly, the provider computing system 104 may not validate the submission rule.

In some embodiments, after steps 408 or 412, the provider computing system 104 may store the submission ruleset in the submission rule repository 135. For instance, the submission ruleset (and each inactive submission rule) may be added to the submission rule repository 135 for storage therein.

Once the provider computing system 104 has validated the submission ruleset, the method 400 proceeds to step 416 at which the provider computing system 104 generates the digital PVA including the one or more linguistic sections. In some embodiments, after generating the digital PVA, the provider computing system 104 may store the digital PVA in the PVA repository 132. In some embodiments, at step 416, the provider computing system 104 may generate a file wrapper or folder and store the folder in the PVA repository 132. In some embodiments, the digital PVA may further include the submission ruleset. In other embodiments, the digital PVA may include a representation of the submission ruleset (e.g., a PDF copy of the submission ruleset). In other embodiments, the digital PVA may include a digital connection, link, or callout to the submission ruleset.

Once the provider computing system 104 has generated the digital PVA, the method 400 proceeds to step 420 at which the provider computing system 104 receives a request to implement or execute the digital PVA file. In some embodiments, the request may be received from one of the user computing devices 112 or the partner computing systems 108. For example, the provider computing system 104 may receive a first digital signature (e.g., from the user computing device 112) to sign the digital document. In some embodiments, after receiving the digital signature from the user computing device 112, the provider computing system 104 may provide the digital PVA to one of the partner computing systems 108 (e.g., as specified by the digital PVA) for a second digital signature. Then, in response, the provider computing system 104 may receive the digital PVA including the second digital signature. In some embodiments, the digital PVA may specify a plurality of digital signatures (e.g., 2 digital signatures, 3 digital signatures, 4 digital signatures, 5 digital signatures, etc.). Then, in response to receiving each digital signature, the provider computing system 104 may implement or activate the digital PVA. For example, the digital PVA may specify three separate digital signatures are required to implement or activate the digital PVA. Then, in response to receiving the three digital signatures, the provider computing system 104 may proceed to step 424 and activate the PVA (e.g., activate the submission rules of the digital PVA). In some embodiments, the provider computing system 104 may receive authentication data from the digital signee (e.g., the user computing device 112, the partner computing system 108, etc.) prior to receiving the digital signature. For instance, the provider computing system 104 may receive authentication data (e.g., a username and corresponding password, a two-factor authentication code, etc.) from the user computing device 112. Then, in response to authenticating or verifying the authentication data, the provider computing system 104 may receive the digital signature from the user computing device 112.

In this regard, the provider computing system 104 may determine the number of signatories of the digital file (e.g., based on the linguistic sections of the digital file). Then, in response to outputting the digital file to each signatory and receiving a digital signature from each signatory, the provider computing system 104 may determine the digital file is fulfilled or prepared to be executed. For instance, the digital PVA may identify three digital signatories and provide an email address for each. In response, the provider computing system 104 may output the digital file to each digital signatory. Then, in response to receiving a digital signature of the digital PVA from each digital signatory, the provider computing system 104 may determine the digital PVA is fulfilled and proceed to step 424, in response.

As described herein, digital signatures may be a cryptographic mechanism used to verify the authenticity, integrity, and non-repudiation of digital documents. They provide a way to ensure that a digital object has not been altered since it was signed and that the signer cannot deny their involvement. In one example, one of the user computing devices 112 and the partner computing systems 108 may each provide the digital PVA file to the provider computing system 104 including a digital signature. The user computing device 112 and the partner computing system 108 may provide a public key to the provider computing system 104, which is stored therein (e.g., in a key repository (not shown)). Next, the user computing device 112 and the partner computing system 108 may sign the digital PVA with an individual private key of a key repository (not shown) and then encrypt the document via an encryption algorithm with the private key. Next, the user computing device 112 and the partner computing system 108 may send the signed and encrypted digital PVA to the provider computing system 104. The provider computing system 104 may then retrieve each public key and use each public key to decrypt the digital signature and encryption of the digital PVA. Next, the provider computing system 104 may compare this unencrypted PVA with the actual PVA. If they match, the provider computing system 104 can verify the digital file was signed and provided by the respective computing device/system (e.g., the user computing device 112 or the partner computing system 108).

In some embodiments, after receiving the digital signatures, the provider computing system 104 may receive the request to implement or activate the digital PVA file. For instance, the digital PVA may include an active date or an implementation date. Then, in response to reaching the start date, the provider computing system 104 may generate and/or receive the request to implement or activate the digital PVA. For instance, the provider computing system 104 may receive three digital signatures for the digital PVA. Further, the digital PVA may include an active date of Jan. 1, 2021 and an end date of Jan. 1, 2023. Accordingly, in response to the present date being Jan. 1, 2021, the provider computing system 104 may proceed to step 424. In some embodiments, the provider computing system 104 may determine a submission rule start date and a submission rule end date (e.g., based on the linguistic sections of the digital PVA, based on the request to execute or implement the PVA, etc.) For instance, the provider computing system 104 may interpret the linguistic sections of the digital PVA to determine a start date of the PVA and an end date of the PVA. The submission rule start date and end date may then be set to match that of the PVA. In another example, the request to execute the PVA may include the submission rule start date and the submission rule end date therein. Then, in response to reaching the submission rule start date, the provider computing system 104 may activate the inactive submission rule. Then, in response to reaching the submission rule end date, the provider computing system 104 may inactivate the active submission rule.

Once the provider computing system 104 has received the request to implement or activate the digital PVA, the method 400 proceeds to step 424 at which the provider computing system 104 activates or implements the digital PVA by activating the at least one inactive submission rule associated with the digital PVA. As described herein, the submission rules may include a lifecycle parameter or field that is set to inactive (e.g., received as inactive or set to inactive by the provider computing system 104 during intake of the submission ruleset).

Accordingly, in response to the request to implement or activate the digital PVA file (e.g., in response to receiving the digital signatures, in response to reaching the activation date, etc.), the provider computing system 104 may set the lifecycle parameter to active, for each of the submission rules of the submission ruleset. In some embodiments, the provider computing system 104 may select the submission ruleset (including the inactive submissions rules) from the submission rule repository 135, activate the submission rules, and then store the active submission rules in the submission rule repository 135.

Once the provider computing system 104 has activated each of the inactive submission rules, the method 400 proceeds to step 428 at which the provider computing system 104 outputs one or more case datasets (e.g., of the case repository 134) based on the at least one active submission rule. For example, at step 428, the provider computing system 104 may select one or more case datasets from the case repository 134, as described with reference to step 316 of the method 300, and then determine if each case dataset meets or fulfills the rule criteria of the at least one active submission rules.

For example, the provider computing system 104 may select the active submission rules, from the submission rule repository 135, in the order or rank of the rules. For instance, as described herein each rule may include an order or rank (e.g., rank or order 1, rank or order 2, rank or order 3, and so on). In this regard, the provider computing system 104 may first select the rule including the rank or order 1, and then determine if the case data of the case dataset fulfills or meets the rule criteria. If the case data fulfills or meets the rule criteria, the provider computing system 104 may output the case dataset. If the case data does not fulfill or meets the rule criteria, the provider computing system 104 select a second rule from the submission rule repository 135. The second rule may have a rank or order of 2. This process may be repeated (e.g., the rule with order 3, the rule with order 4, and so on) until a match is found. If no rule including rule criteria that match or meet the case data is found, the method 400 may end, and the provider computing system 104 may not output the case dataset.

In some embodiments, prior to step 428, the provider computing system 104 may determine if the rule trigger of the active submission rule is met or fulfilled. For instance, the provider computing system 104 may select the case dataset, in response to the case dataset meeting or fulfilling a rule trigger of one or more rules (e.g., the case dataset reaching a specific state or status (e.g., complete, approved, submitted, new, etc.)). In other embodiments, the provider computing system 104 may select the case dataset, in response to the case dataset being submitted to one of the partner computing systems 108. If the rule trigger is not fulfilled, the provider computing system 104 may select the next submission rule. If the rule trigger is fulfilled, the provider computing system 104 may determine of the case data of the case dataset fulfills the rule criteria of the submission rule.

To determine if the case data of the case dataset matches or fulfills the rule criteria of the rule, the provider computing system 104 may determine if the fields or pieces of case data identified in the rule criteria are the same as specified in the rule criteria. For instance, the rule criteria may include a specific medical product (e.g., as identified by NDC), a specific adverse event (as identified by MedDRA term and code), and a specific seriousness (e.g., results in death). Accordingly, in response to each of the rule criteria matching or being the same as the respective pieces of case data (e.g., the medical product data of the case data includes the same NDC as the rule criteria, the adverse event of the case data includes the same MedDRA code as the case criteria, and the seriousness of the case data is the same as the seriousness of the rule criteria), the provider computing system 104 may determine the rule criteria is met or matched by the case data. In other embodiments, provider computing system 104 may determine the rule criteria is met, in response to a single rule criteria matching the case data of the case dataset (e.g., the medical product data of the case data includes the same NDC as the rule criteria, but the adverse event of the case data and the seriousness of the case data are different than the rule criteria). The ruleset may include a specific partner computing system 108 or electronic address to output the case dataset to. Further, the rule may include a specific timeframe, date, or number of days in which the case dataset is to be output.

If, at step 428, the provider computing system 104 determines the case data of the case dataset does not meet the rule criteria, the provider computing system 104 may select a different rule of the ruleset from the rule repository 135. In comparison, if, at step 428, the provider computing system 104 determines the case data of the case dataset meets or fulfills the rule criteria, the provider computing system 104 may output the case dataset including at least a portion of the case dataset to the electronic address of the ruleset, within the specified timeframe of the rule.

In some embodiments, prior to step 428, the provider computing system 104 may intake a source file and generate a case dataset. For instance, the provider computing system 104 may receive a source file including adverse event data. The source file and the adverse event data may be associated with one or more adverse events. For instance, the source file may include adverse event information for each adverse event. Further, the source file may be received from one of the user computing devices 112 or one of the partner computing systems 108. In some embodiments, the source file may be an E2B (R2 or R3) XML file received via an AS2 Gateway communication from the one of the partner computing systems 108 or the user computing devices 112. In other embodiments, the source file may be received from one of the partner computing systems 108 via an application programming interface (API) of the provider computing system 104. In other embodiments, the source file may be at least one of a PDF file, an Excel file, a CSV file, an email, or other file types described herein. The adverse event data may identify or include medical product or substance data (e.g., a substance name, a medical product slang name or term, a medical product trade name, a NDC, a medical product identifier, a dosage, a country of origin, a strength, a lot number, a route of administration, etc.), study data (e.g., a study identifier), an adverse event term and code (e.g., a MedDRA term and code), reporter data (e.g., a reporter name, a reporter country, a reporter address or contact information (e.g., email, phone number, IP address, FTP address, etc.)), patient data (e.g., patient initials, patient address or contact information), a report type (e.g., spontaneous, from study, from marketed medical product, etc.), a seriousness of the adverse event, and the like.

Next, the provider computing system 104 may determines or generates case data based on the source file. In some embodiments, the provider computing system 104 may determine the case data based at least partially on the adverse event data. For instance, the provider computing system 104 may transform or add each piece of adverse event data to a specific field or portion of the case data. In one example, an adverse event term of the adverse event data may be added to an adverse event field of the case data. In this regard, the case data may include at least a portion of the adverse event data of the source file. In another example, the provider computing system 104 may determine at least a portion of the case data by transforming adverse event data that is in an incorrect format into a correct format (e.g., "SE" to "Sweden"). In some embodiments, at step 308, the provider computing system 104 may further generate a priority of the case based on the adverse event data, a rank of the adverse events associated with the current case, a rank of the medical products, and the like. Likewise, to determine case data, the provider computing system 104 may retrieve the medical product and/or study data of the medical product and/or study identified in the source file from a medical product repository (not shown) or study repository (not shown) and determine case data by matching the adverse event data with the medical product and/or study data. For example, the adverse event data of the source file may indicate that the patient consumed Y Milliliters of a medical product X on Mar. 23, 2000. The provider computing system 104 may then search the medical product repository (not shown) for medical product data pertaining to medical product X and return additional values and medical product data (e.g., dosage of medical product X, the chemical formula of medical product X, expected side effects of medical product X, a clinical study that medical product X is currently being studied in, a clinical study #, pertaining to medical product X, and the like) as previously provided by the user. This additional medical product data and study data may then be included in the case data. In another example, the adverse event information may indicate that the patient consumed medical products A, B, and C on Mar. 23, 2000. The provider computing system 104 may determine that the user has not provided any medical product data pertaining to medical products A and B but has provided medical product data pertaining to medical product C. Accordingly, the provider computing system 104 may retrieve the medical product data pertaining to medical product C as well as assign a ranking of one to the medical product C, while assigning a ranking of two or three to the medical products A and B. The ranking may then be used to list or sort the medical product data within the case dataset (i.e., a ranking of one appears higher than a ranking of two, and so on) and on any user interfaces.

Next, the provider computing system 104 may generate the case dataset including the case data. In some embodiments, the provider computing system 104 may generate a case data object (also referred to as a data record) associated with or including the case identifier of the case. In this regard, the case dataset may include a case data object which may be used as a vehicle or apparatus for the case dataset and storing the case data within the case repository 134 of the provider computing system 104. For instance, the provider computing system 104 may determine or generate the case data and then populate the case data object with the case data. After generating the case dataset, the provider computing system 104 may store the case dataset in the case repository 134.

Figure 5C:
Figure 7C:
Figure 7D:

Referring now to FIGS. 5A-5C, user interfaces shown and displayed to the user of the one or more user computing devices 112 during the method 200, 300, and/or 400 are shown, according to example embodiments. As described herein, the user interfaces of FIGS. 5A-5C may be one or more of web interfaces generated by the provider computing system 104 and rendered by each of the user computing devices 112 as part of a web application or graphical user interfaces downloaded and generated by each of the user computing devices 112 as part of a software application (e.g., a mobile application, etc.). Further, the user interfaces shown on FIGS. 5A-5C allow for communication between the user) and the provider computing system 104 via the respective user computing device 112 (specifically via the I/O circuit 180, respectfully). Through interaction with the various user interfaces, the user may provide user input, feedback, and other data requested by the provider computing system 104. In this regard, it should be understood that each interaction described herein by the user with the user interfaces of FIGS. 5A-5C may be provided to one or more of the user computing devices 112 and then transmitted to the provider computing system 104 and that each action described herein as occurring to the respective user computing device 112 (e.g., navigating to a certain page, generating a popup, etc.) may be performed by the provider computing system 104.

Referring now to FIGS. 5A-5C, the PVA page 500 which can be displayed on a display the I/O circuit 180 of the user computing device 112, is shown. In general, the PVA page 500 provides the user an interface to setup, modify, and manage a specific digital PVA and the PVA data associated with the digital PVA. As shown, the PVA page 500 includes a details or overview section 504, a covered medical product section 520, a study section 528, a country section 540, a contacts or partner section 552, and an obligations or jobs section 566. To render or generate the PVA page 500 on the user computing device 112, the provider computing system 104 may provide the digital PVA (including the PVA properties) and/or PVA data to the user computing device 112. In this regard, it should be understood that each of the sections, fields, or buttons of the PVA page 500 may be or included in the PVA data or properties described herein. During the method 200, it should be understood that each of the sections (e.g., the section 504-566) and the fields thereof may be determined or generated, by the PVA management and analysis circuit 144) based on the linguistic section of the PVA (e.g., using an LLM). As a result, a user computing device 112 may receive the PVA page 500 with each section and field thereof including PVA data from the linguistic sections. In comparison, during method 300, it should be understood that each of the sections (e.g., the section 504-566) and the fields thereof may be received or generated by the user computing device 112. As a result, a user computing device 112 may receive the PVA page 500 with each section and field thereof empty or at least partially empty (e.g., multiple sections empty and one filled out, etc.). Then, the user computing device 112 may fill each section out and provide the resulting fields and data to the provider computing system 104 for storage therein and generation as a PVA.

Referring now to FIG. 5A, the details or overview section 504 provides the user of the respective user computing device 112 with an interface to set, manage, and update at least a portion of the PVA data associated with the PVA of the PVA page 500. As shown, details section 504 includes a relationship field 506, an agreement title field 508, an agreement effective date or start date field 510, an agreement end date 512 field, a PVA scope field 514, an agreement owner field 516, and an agreement notes field 518. Through interaction with the one or more fields of the details section 504, the user computing device 112 may initially set and manage the fields or pieces of PVA data or parameters associated with the PVA.

The relationship field 506 may be a selectable and/or editable text field through which the user of the respective user computing device 112 can edit and/or initially set the partner with which the agreement is associated or effective for, which may then be sent by the respective user computing device 112 to the provider computing system 104 for storage. For example, as shown in FIG. 5A, the relationship field 506 may be set to supplier X indicating the agreement is between the customer of the PVA page 500 and supplier X. Similarly, the agreement title field 508 may be a selectable and/or editable text field through which the user of the respective user computing device 112 can edit and/or initially set the title of the PVA associated with the PVA page 500, which may then be sent by the respective user computing device 112 to the provider computing system 104 for storage.

The agreement effective or start date field 510 may be a selectable and/or editable date field through which the user of the respective user computing device 112 can edit and/or initially set the start date of the PVA, which may then be sent by the respective user computing device 112 to the provider computing system 104 for storage. The provider computing system 104 may then use the PVA start date in association with the digital jobs or obligations described herein (e.g., when starting a new digital job, as described herein). Likewise, the agreement end date field 512 may be a selectable and/or editable date field through which the user of the respective user computing device 112 can edit and/or initially set the end date of the PVA, which may then be sent by the respective user computing device 112 to the provider computing system 104 for storage. The provider computing system 104 may then use the PVA end date in association with the digital jobs or obligations described herein (e.g., when ending or stopping a digital job, as described herein).

The PVA scope field 514 may be a selectable and/or editable text field through which the user of the respective user computing device 112 can edit and/or initially set the scope or countries of the PVA, which may then be sent by the respective user computing device 112 to the provider computing system 104 for storage. Similarly, the agreement owner field 516 may be a selectable and/or editable text field through which the user of the respective user computing device 112 can edit and/or initially set the user or customer who is in charge (e.g., owns) the PVA, which may then be sent by the respective user computing device 112 to the provider computing system 104 for storage. The owner or user who is in charge of the PVA may be the user to which notifications for the PVA (e.g., cases have been received, a digital job has been processed, etc.) may be provided. Likewise, the agreement notes field 518 may be a selectable and/or editable text field through which the user of the respective user computing device 112 can edit and/or initially set text notes associated with the PVA, which may then be sent by the respective user computing device 112 to the provider computing system 104 for storage.

Still referring to FIG. 5A, the covered medical products section 520 provides the user of the respective user computing device 112 with an interface to set, manage, and update the medical product(s) associated with the PVA of the PVA page 500. As shown, covered medical products section 520 includes one or more medical product representations 522. Through interaction with the one or more fields of each medical product representation 522, the user computing device 112 may initially set and manage the medical products for which the PVA is applicable (e.g., the medical product parameter). Each medical product representation 522 represents a specific medical product or medical product data object which is used to assign medical products to the PVA. In this regard, each medical product representation 522 may include a name field 524, a product type field 526, and an abbreviation field 527.

The name field 524 may be a selectable and/or editable text field through which the user of the respective user computing device 112 can edit and/or initially set the name of the medical product associated with the medical product representation 522 which may then be sent by the respective user computing device 112 to the provider computing system 104 for storage. Further, the name field 516 may be a selectable button that, when selects, causes the user computing device 112 to navigate to a medical product page (not shown) for the medical product. In this regard, the abbreviation field 527 may be a selectable and/or editable text field through which the user of the respective user computing device 112 can edit and/or initially set the abbreviation of the name of the medical product associated with the medical product representation 522 which may then be sent by the respective user computing device 112 to the provider computing system 104 for storage.

Similarly, the product type field 526 may be a selectable and/or editable text field through which the user of the respective user computing device 112 can edit and/or initially set the name of the type (e.g., drug, cosmetic, over-the-counter (OTC) drug, device, vaccine, biologic, etc.) of the medical product associated with the case medical product representation 522 which may then be sent by the respective user computing device 112 to the provider computing system 104 for storage.

Referring now to FIG. 5B, the study section 528 provides the user of the respective user computing device 112 with an interface to set, manage, and update the study(s) associated with the PVA of the PVA page 500. As shown, study section 528 includes one or more clinical study representations 530. Through interaction with the one or more clinical study representations 530, the user computing device 112 may initially set and manage the clinical studies for which the PVA is applicable (e.g., the study parameter). Each clinical study representation 530 represents a specific clinical study which is used to assign clinical studies to the PVA. In this regard, each clinical study representation 530 may include a number field 532, a name field 534, a study type field 536, and a masking field 538.

The number field 532 may be a selectable and/or editable text field through which the user of the respective user computing device 112 can edit and/or initially set a number or registration number of the clinical study associated with the clinical study representation 530 which may then be sent by the respective user computing device 112 to the provider computing system 104 for storage. Likewise, the name field 534 or the number field 532 may be a selectable button that, when selects, causes the user computing device 112 to navigate to a study page (not shown) for the clinical study of the clinical study representation 530. The name field 534 may be a selectable and/or editable text field through which the user of the respective user computing device 112 can edit and/or initially set the name of the clinical study associated with the clinical study representation 530 which may then be sent by the respective user computing device 112 to the provider computing system 104 for storage.

The study type field may be a selectable and/or editable text field through which the user of the respective user computing device 112 can edit and/or initially set the type of the study (e.g., clinical trial, individual patient use, post-market study, etc.) with the clinical study representation 530 which may then be sent by the respective user computing device 112 to the provider computing system 104 for storage. Additionally, the masking field 538 may be a selectable and/or editable text field through which the user of the respective user computing device 112 can edit and/or initially type of masking (e.g., double-blinded, blinded, open label, etc.) used in the clinical study associated with the clinical study representation 530 which may then be sent by the respective user computing device 112 to the provider computing system 104 for storage. The type of masking may then be used by the provider computing system 104 to mask or hide clinical study data (e.g., patient-drug combination, drug type, drug lot number, etc.) of the clinical study associated with the clinical study representation 530.

Still referring to FIG. 5B, the country section 540 provides the user of the respective user computing device 112 with an interface to set, manage, and update the countries associated with the PVA of the PVA page 500. As shown, country section 540 includes one or more country representations 542. Through interaction with the one or more country representations 542, the user computing device 112 may initially set and manage the countries for which the PVA is applicable (e.g., the country parameter). Each country representation 542 represents a specific country which is used to select case datasets and digital documents described herein. In this regard, each country representations 542 may include a 2-letter code field 546, a 3-letter code field 548, and a health agency field 550.

The 2-letter code field 546 and the 3-letter code field 548 may be text (e.g., read-only) fields which represent the established 2-letter and 3-letter codes, respectfully, of the country of the country representation 542. For instance, as shown, the country representation 542 for France include the 2-letter code field 546 "FR" and the 3-letter code field 548 "FRA".

Similarly the health agency field 550 may be a text field which represents the health agency associated with the specific country of the country representation 542. For instance, as shown, France and Germany both use the EMA as their health agency. In comparison, a country representation 542 for the USA may include the health agency "FDA".

Still referring to FIG. 5B, the partner or contacts section 554 provides the user of the respective user computing device 112 with an interface to set, manage, and update the contacts or partners associated with the PVA of the PVA page 500. As shown, partner section 554 includes one or more partner representations 554. Through interaction with the one or more partner representations 554, the user computing device 112 may initially set and manage the partners for which the PVA is applicable (e.g., the partner parameter and/or the electronic communication protocol parameter). Each partner representations 554 represents a specific partner or electronic address which is used to assign partners to the PVA. In this regard, each partner representations 554 may include a name field 556, a person field 558, a vault user field 560, a contract party field 562, and a communication method or protocol field 564.

The name field 556 may be a selectable and/or editable text field through which the user of the respective user computing device 112 can edit and/or initially set the name of the partner (e.g., manufacturer x, pharma y, etc.) associated with the partner representation 554 which may then be sent by the respective user computing device 112 to the provider computing system 104 for storage. Further, the name field 556 may be a selectable button that, when selected, causes the user computing device 112 to navigate to a partner page (not shown) associated with the partner of the partner representation 554.

The person field 558 may be a selectable and/or editable text field through which the user of the respective user computing device 112 can edit and/or initially set the name of point-of-contact or other person of the partner (e.g., pharma Y) which may then be sent by the respective user computing device 112 to the provider computing system 104 for storage. Likewise, the vault user field 560 may be a selectable and/or editable text field through which the user of the respective user computing device 112 can edit and/or initially set the name of a user in Vault® which may be associated with or a part of the partner (e.g., Pharma Y) which then be sent by the respective user computing device 112 to the provider computing system 104 for storage.

The contract party field 562 may be a selectable and/or editable text field through which the user of the respective user computing device 112 can edit and/or initially set role (e.g., sponsor, partner, cosigner, etc.) of the partner associated with the partner representation 554 which may then be sent by the respective user computing device 112 to the provider computing system 104 for storage. The sponsor may be the company or customer of the PVA page 500 and the user computing device 112, and the partner may be the partner or user of the partner computing system 108. Likewise, the communication method field 564 may be a selectable and/or editable text field through which the user of the respective user computing device 112 can edit and/or initially set the electronic communication protocol to be used in the transfer of data to/or from the partner of the partner representation 554 which may then be sent by the respective user computing device 112 to the provider computing system 104 for storage. For instance, the communication method field 564 may be set to email, Vault® task, AS2 Gateway, SFTP or FTP, and the like.

Referring now to FIG. 5C, the obligations or digital job section 566 provides the user of the respective user computing device 112 with an interface to set, manage, and update the obligations or digital jobs associated with the PVA of the PVA page 500. As shown, digital job section 566 includes one or more obligation or digital job representations 568. Through interaction with the one or more digital job representations 568, the user computing device 112 may initially set and manage the digital jobs of the PVA. Each digital job representation 568 represents a specific digital job which is executed or processed by the provider computing system 104. In this regard, each digital job representation 568 may include a name field 570, an obligation category field 572, a clause or linguistic section title field 574, a partner field 576, and a sponsor field 578.

The name field 570 may be a selectable and/or editable text field through which the user of the respective user computing device 112 can edit and/or initially set the name of the digital job associated with the digital job representation 568 which may then be sent by the respective user computing device 112 to the provider computing system 104 for storage. Further, the name field 570 may be a selectable button that, when selected, causes the user computing device 112 to navigate to a digital job page (not shown) associated with the digital job of the digital job representation 568.

The obligation category field 472 may be a selectable and/or editable text field through which the user of the respective user computing device 112 can edit and/or initially set the obligation or digital document type (e.g., literature, case datasets, signals, PSMFs) associated with the digital job representation 568 which may then be sent by the respective user computing device 112 to the provider computing system 104 for storage. For instance, the obligation category field 572 may be used, by the provider computing system 104, to determine the digital document which may be selected by the provider computing system (e.g., at step 212 or 316) when processing the digital job.

The clause title field 574 may be a selectable and/or editable text field through which the user of the respective user computing device 112 can edit and/or initially set the name of the linguistic section or clause associated with the digital job of the digital job representation 568 which may then be sent by the respective user computing device 112 to the provider computing system 104 for storage. Further, the clause title field 574 may be a selectable button that, when selected, causes the user computing device 112 to navigate to the linguistic section or clause identified therein.

The partner contact field 576 may be a selectable and/or editable text field through which the user of the respective user computing device 112 can edit and/or initially set the partner (e.g., the partner representation 554) of the digital job associated with the digital job representation 568 which may then be sent by the respective user computing device 112 to the provider computing system 104 for storage. For example, the partner contact field 576 may be set to one of the partner representations 554 (which has a contract party field of "partner") managed in the partner section 552 and used thereafter for the transacting of the digital documents of the digital job (e.g., the case datasets, the aggregate reports, etc.).

Similarly, the sponsor contact field 578 may be a selectable and/or editable text field through which the user of the respective user computing device 112 can edit and/or initially set the sponsor partner (e.g., the partner representation 554) of the digital job associated with the digital job representation 568 which may then be sent by the respective user computing device 112 to the provider computing system 104 for storage. For example, the sponsor contact field 578 may be set to one of the partner representations 554 (which has a contract part field 562 "sponsor") managed in the partner section 552 and used thereafter for the transacting of the digital documents of the digital job (e.g., the case datasets, the aggregate reports, etc.).

Referring now to FIGS. 6A-6B, a digital PVA (also referred to as a digital PVA file) 600 is shown according to an example embodiment. The example shown is an hypertext markup language (HTML) PVA. The digital PVA 600 is shown to include a first definition linguistic section 604, a second case or safety data exchange linguistic section 608, and a third signal detection and risk management linguistic section 612.

Referring now to FIGS. 7A-7D, the submission ruleset file 700 is shown, according to an example embodiment. As shown, the submission ruleset file 700 includes multiple submission rules such as the Over-the-Counter (OTC) submission/reporting rule, the Non-serious submission rule, the Serious Unexpected Suspected Adverse Reaction (SUSAR) submission rule, and the FDA submission rule. In some embodiments, each submission rule is delineated or arranged by a specific row. For instance, the submission ruleset file 700 includes four specific submission rules in four separate rows. Similarly, the priority or ranking, the rule trigger (e.g., case state, etc.), the rule criteria (e.g., Agency, device report type, report type, Fatal, expected, life threatening, serious/seriousness, study type, suspect, etc.), and the timeframe of the specific submission rule are delineated or arranged by column. In this regard, the submission ruleset files described herein (e.g., the submission ruleset file 700) may include a row (or column) for each specific submission rule and a column (or row) within the row of the specific submission rule for the data of the submission rule (e.g., the priority, the rule criteria, the rule trigger, the timeframe, etc.).

While the submission ruleset file 700 is shown as an excel file, other file types are possible. For instance, the submission ruleset file 700 may be an Excel file, a Comma Separated Value (CSV) file, an OpenDocument Spreadsheet (ODS) file, a PDF file, a .DOCX file, or other digital file types.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a list box, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for executing at least a portion of a digital file comprising:
   receiving, by a provider computing system, one or more linguistic sections of the digital file, wherein the one or more linguistic sections include first text data in a first language and identify a medical product associated with the digital file;
   receiving, by the provider computing system, a submission ruleset including at least one submission rule, wherein the submission rule includes a rule criteria and a lifecycle parameter set to inactive;
   validating, by the provider computing system, the submission ruleset;
   generating, by the provider computing system, the digital file including the one or more linguistic sections;
   outputting, by the provider computing system, the digital file;
   receiving, by the provider computing system and in response to outputting the digital file, a digital signature of the digital file;
   activating, by the provider computing system, the submission rule by modifying the lifecycle parameter of the submission rule from inactive to active;
   selecting, by the provider computing system, a case dataset including case data from a repository of the provider computing system, wherein the case data includes medical product data associated with the medical product;
   determining, by the provider computing system, the case data of the case dataset fulfills the rule criteria of the submission rule; and
   outputting, by the provider computing system, the case dataset in response to the case data of the case dataset fulfilling the rule criteria of the submission rule.

2. The method of claim 1, wherein the digital file is a digital pharmacovigilance agreement (PVA) file, and wherein the case dataset is output as an E2B XML file.

3. The method of claim 1, wherein the submission rule includes a timeframe, and wherein the case dataset is output within the timeframe.

4. The method of claim 1, wherein the submission ruleset is received in a submission ruleset file, and wherein the submission ruleset file is at least one of: an Excel file, a Comma-Separated Value (CSV) file, or an OpenDocument Spreadsheet (ODS) file.

5. The method of claim 1, wherein validating the submission rule comprises:
   determining, by the processing circuit, the rule criteria of the submission rule is correctly formatted; and
   validating, by the provider computing system, the submission rule based on the rule criteria of the submission rule being correctly formatted.

6. The method of claim 1, wherein receiving the digital signature comprises:
   receiving, by the provider computing system, a public key;
   receiving, by the provider computing system, an encrypted version of the digital file; and unencrypting, by the provider computing system, the digital file via the public key, wherein the unencrypted digital file includes a digital signature that is a private key corresponding to the public key.

7. The method of claim 1, wherein the one or more linguistic sections of the digital file identify a plurality of signatories of the digital file, and wherein the digital signature is a first digital signature, and wherein the method further comprises:
receiving, by the provider computing system, a plurality of digital signatures of the digital file including the first digital signature; and
determining, by the provider computing system, the plurality of digital signatures fulfill the digital file based on the identified plurality of signatories of the digital file,
wherein the submission rule is activated in response to the plurality of digital signatures fulfilling the digital file.

8. The method of claim 1, wherein the submission rule is a first submission rule, wherein the rule criteria is a first rule criteria, wherein the lifecycle parameter is a first lifecycle parameter, wherein the repository is a first repository, and wherein the submission ruleset includes a second submission rule including a second rule criteria and a second lifecycle parameter set to inactive, and wherein the method further comprises:
activating, by the provider computing system, the second submission rule by modifying the second lifecycle parameter of the submission rule from inactive to active;
storing, by the provider computing system, the first submission rule and the second submission rule in a second repository of the provider computing system;
selecting, by the provider computing system, the second submission rule from the second repository;
determining, by the provider computing system, the case data of the case dataset does not fulfill the second rule criteria; and
selecting, by the provider computing system and in response to determining the case data of the case dataset does not fulfill the second rule criteria, the first submission rule from the second repository.

9. The method of claim 8, wherein the first submission rule and the second submission rule each include a rank, wherein the second rule is selected based on the rank of the second rule being a first rank, and wherein the first rule is selected, in response to determining the case data of the case dataset does not fulfill the second rule criteria, based on the rank of the first rule being a second rank.

10. The method of claim 1, wherein the one or more linguistic sections of the digital file identify an electronic address, wherein the electronic address is at least one of: an email address, a file transfer protocol (FTP) address, or an Internet Protocol (IP) address, and wherein the method further comprises:
determining, by the provider computing system, the electronic address based on the one or more linguistic sections of the digital file,
wherein the case dataset is output to the determined electronic address.

11. The method of claim 1, wherein the one or more linguistic sections of the digital file identify a start date and an end date, and wherein the method further comprises:
determining, by the provider computing system, the start date based on the one or more linguistic sections of the digital file,
wherein the submission rule is activated in response to the present date being the start date;
determining, by the provider computing system, the end date based on the one or more linguistic sections of the digital file; and
inactivating, by the provider computing system and in response to the present date being the end date, the submission rule by modifying the lifecycle parameter of the submission rule from active to inactive.

12. The method of claim 1, further comprising:
receiving, by the provider computing system, a source file;
determining, by the provider computing system, the case data based on the source file;
generating, by the provider computing system, the case dataset including the case data; and
storing, by the provider computing system, the case dataset in the repository.

13. A method for executing at least a portion of a digital file comprising:
receiving, by a provider computing system, one or more linguistic sections of the digital file, wherein the one or more linguistic sections include first text data in a first language and identify a medical product associated with the digital file;
generating, by the provider computing system, a submission ruleset including an inactive submission rule based on the one or more linguistic sections of the digital file, wherein the inactive submission rule includes a rule criteria;
generating, by the provider computing system, the digital file including the one or more linguistic sections;
outputting, by the provider computing system, the digital file;
receiving, by the provider computing system and in response to outputting the digital file, a digital signature of the digital file;
activating, by the provider computing system, the inactive submission rule;
selecting, by the provider computing system, a case dataset including case data from a repository of the provider computing system, wherein the case data includes medical product data associated with the medical product;
determining, by the provider computing system, the case data of the case dataset fulfills the rule criteria of the active submission rule; and
outputting, by the provider computing system, the case dataset in response to the case data of the case dataset fulfilling the rule criteria of the active submission rule.

14. The method of claim 13, wherein the digital file is a digital pharmacovigilance agreement (PVA) file, and wherein the case dataset is output as an E2B XML file.

15. The method of claim 13, wherein the submission rule includes a timeframe, and wherein the case dataset is output within the timeframe.

16. The method of claim 13, wherein generating the submission rule comprises:
interpreting, by the provider computing system, the one or more linguistic sections of the digital file to determine the rule criteria of the submission rule; and
generating, by the provider computing system, the submission ruleset including the inactive submission rule including the rule criteria.

17. The method of claim 16, wherein interpreting the one or more linguistic sections of the digital file comprises:
receiving, by the provider computing system, a confidence threshold;

determining, by the provider computing system, the rule criteria of the submission rule and a confidence level associated with the rule criteria based on the one or more linguistic sections of the digital file; and determining, by the provider computing system, the confidence level associated with the rule criteria meets the confidence threshold.

18. The method of claim 16, wherein interpreting the one or more linguistic sections of the digital file comprises:

receiving, by the provider computing system, a confidence threshold;

determining, by the provider computing system, the rule criteria of the submission rule and a confidence level associated with the rule criteria based on the one or more linguistic sections of the digital file;

determining, by the provider computing system, the confidence level associated with the rule criteria does not meet the confidence threshold;

generating, by the provider computing system and in response to the confidence level associated with the rule criteria not meeting the confidence threshold, a request for the rule criteria;

outputting, by the provider computing system, the request; and receiving, by the provider computing system, the rule criteria.

19. A method for executing at least a portion of a digital file comprising:

receiving, by a provider computing system, one or more linguistic sections of the digital file, wherein the one or more linguistic sections include first text data in a first language and identify a medical product associated with the digital file;

receiving, by the provider computing system, a submission ruleset including at least one submission rule;

validating, by the provider computing system, the submission ruleset;

generating, by the provider computing system, the digital file including the one or more linguistic sections;

receiving, by the provider computing system, a request to execute the digital file;

receiving, by a provider computing system, a source file;

determining, by the provider computing system, case data based on the source file, wherein the case data includes medical product data associated with the medical product;

generating, by the provider computing system, a case dataset including the case data;

determining, by the provider computing system, the case data of the case dataset fulfills the rule criteria of the submission rule; and outputting, by the provider computing system, the case dataset in response to the case data of the case dataset fulfilling the rule criteria of the submission rule.

20. The method of claim 19, wherein the digital file is a digital pharmacovigilance agreement (PVA) file, and wherein the case dataset is output as an E2B XML file.

* * * * *